US012755025B2

(12) United States Patent
Chen et al.

(10) Patent No.: US 12,755,025 B2
(45) Date of Patent: Oct. 6, 2026

(54) MANAGING DATA LAYER SYNCHRONIZATION FOR CONTAINER IMAGES

(71) Applicant: International Business Machines Corporation, Armonk, NY (US)

(72) Inventors: Xiao Ling Chen, Changping District (CN); Juliet Candee, Brewster, NY (US); Ming Ran Liu, Beijing (CN); Wen Ji Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 19/017,842

(22) Filed: Jan. 13, 2025

(65) Prior Publication Data

US 2026/0203409 A1 Jul. 16, 2026

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ......................... G06F 21/577; G06F 2221/033
See application file for complete search history.

(56) References Cited

U.S. PATENT DOCUMENTS 10,303,657 B2 5/2019 Huang et al.
10,713,277 B2 7/2020 Auer et al.
10,936,293 B2 3/2021 Varadharajan Kannan
12,039,321 B2 * 7/2024 Sui ............................ G06F 8/65
2001/0013030 A1 * 8/2001 Colby ..................... G06F 16/22
2004/0177075 A1 * 9/2004 Rangadass ........... G06Q 10/087
2006/0117012 A1 * 6/2006 Rizzolo .................. G06Q 10/06 707/999.009
2017/0180346 A1 * 6/2017 Suarez ................ G06F 9/45558
2018/0088926 A1 * 3/2018 Abrams ................ H04L 67/568
2018/0295211 A1 * 10/2018 Pirat ....................... H04L 67/34
(Continued)

FOREIGN PATENT DOCUMENTS

CN 102118310 A * 7/2011
CN 114035808 A * 2/2022 ............... G06F 8/60
(Continued)

OTHER PUBLICATIONS

Chen, et al., "Synchronization of Data Layers in Container Images", U.S. Appl. No. 19/037,890, filed Jan. 27, 2025, 51 pages.
(Continued)

*Primary Examiner* — John B King
(74) *Attorney, Agent, or Firm* — CHIP LAW GROUP

(57) ABSTRACT

Management of data layer synchronization for container images includes receiving a command and detecting at least one source data layer associated with a source container image in a source repository. A system extracts at least one identifier from the command. The system identifies the at least one identifier in manifest information of each container image of a set of container images. The system detects the source container image from the set of container images and detects the at least one source data layer of the source container image. The system synchronizes the at least one source data layer with the target data layer of the target container image.

20 Claims, 13 Drawing Sheets

(56) References Cited

U.S. PATENT DOCUMENTS

| | | | | |
|---|---|---|---|---|
| 2019/0325996 | A1* | 10/2019 | Yelpaala | G16H 10/60 |
| 2021/0064412 | A1 | 3/2021 | Yamaguchi | |
| 2021/0096894 | A1 | 4/2021 | Rupprecht et al. | |
| 2022/0060486 | A1* | 2/2022 | Al-Mousa | G06F 21/44 |
| 2023/0325169 | A1 | 10/2023 | Chibon et al. | |
| 2024/0419423 | A1 | 12/2024 | Chen et al. | |
| 2024/0427901 | A1* | 12/2024 | Gupta | G06F 21/577 |
| 2025/0125947 | A1* | 4/2025 | Miller | H04L 9/0825 |
| 2025/0131096 | A1* | 4/2025 | Lekies | G06F 21/577 |

FOREIGN PATENT DOCUMENTS

| | | | | |
|---|---|---|---|---|
| CN | 116483928 | A * | 7/2023 | G06F 16/27 |
| CN | 117215714 | A * | 12/2023 | |
| WO | 2019/165573 | A1 | 9/2019 | |
| WO | WO-2021232845 | A1 * | 11/2021 | G06F 8/63 |

OTHER PUBLICATIONS

Chen, et al., "Automatic Redeploying/Upgrading of Containers on Multiple Nodes in an Information Technology Infrastructure Based on Unavailable Patches", U.S. Appl. No. 18/672,100, filed May 23, 2024, 37 pages.

Chen, et al., "Recovery of Containers Having Image Layers with Inter-Layer Dependencies", U.S. Appl. No. 19/014,921, filed Jan. 9, 2025, 36 pages.

Github, "Efficiently Layered Image", https://kgb1001001.github.io/cloudadoptionpatterns/container-building/Efficiently-Layered-Image/, dated Mar. 14, 2025, 4 pages.

Gitlab, "Container Scanning", https://docs.gitlab.com/user/application_security/container_scanning/, dated Mar. 14, 2023, 17 pages.

* cited by examiner

MANAGING DATA LAYER SYNCHRONIZATION FOR CONTAINER IMAGES

BACKGROUND

The disclosure relates to data synchronization and more particularly, to the management of data layer synchronization for container images.

In container technology, container images serve as portable units for software deployment, encapsulating applications and the applications' dependencies within isolated environments. Each container image is composed of multiple data layers, where each data layer represents a specific set of changes or additions to an underlying filesystem. The multiple data layers are structured in a way that allows for efficient storage and transfer, enabling rapid deployment and scaling of applications. When a container image is created, each data layer of the container image is committed as part of the container image, and the entire container image is subsequently pushed to a container repository for distribution. The container repository acts as a centralized storage solution, allowing users to easily access and deploy the container images as required. When updating the applications, the users must upload or download the multiple data layers associated with the applications. As a result, the process of updating the applications is time-consuming, resource-intensive, and potentially error-prone.

SUMMARY

In various embodiments of the disclosure, a computer-implemented method for managing data layer synchronization for container images is described. The computer-implemented method includes receiving a command for synchronizing at least one source data layer of a source container image with a target data layer of a target container image. The computer-implemented method further includes extracting at least one identifier from the command. Further, the computer-implemented method includes identifying the at least one identifier in manifest information of each container image of a set of container images. The computer-implemented method further includes detecting the source container image from the set of container images based on the identification of the at least one identifier in the manifest information. The set of container images includes the source container image. The manifest information associated with the detected source container image includes the at least one identifier. The computer-implemented method further includes detecting at least one source data layer of the source container image based on the detection of the source container image. The computer-implemented method includes synchronizing the detected at least one source data layer with the target data layer of the target container image.

In various embodiments of the disclosure, a computer system for managing data layer synchronization for container images is described. The computer system includes a processor set, one or more computer-readable storage media, and program instructions stored on one or more computer-readable storage media. The program instructions executable by the processor set to cause the processor set to receive a command to synchronize at least one source data layer of a source container image with a target data layer of a target container image. The program instructions are executable by the processor set to cause the processor set to extract at least one identifier from the command. Further, the program instructions executable by the processor set to cause the processor set to identify the at least one identifier in manifest information of each container image of a set of container images. The program instructions executable by the processor set to cause the processor set to detect the source container image from the set of container images based on the identification of the at least one identifier in the manifest information. The set of container images includes the source container image. The manifest information associated with the detected source container image includes the at least one identifier. The program instructions executable by the processor set to cause the processor set to obtain a shared layer attribute from the source container image. The shared layer attribute corresponds to second metadata used to detect the at least one source data layer within a source repository. Further, the program instructions executable by the processor set to cause the processor set to detect the at least one source data layer of an original source container image in the source repository. The at least one source data layer is detected based on the shared layer attribute. Furthermore, the program instructions executable by the processor set to cause the processor set to synchronize the detected at least one source data layer with the target data layer of the target container image.

In various embodiments of the disclosure, a computer program product for managing data layer synchronization for container images is described. The computer program product includes one or more computer-readable storage medium and program instructions stored on the one or more computer-readable storage media to perform operations. The operations include receiving a command for synchronizing at least one source data layer of a source container image with a target data layer of a target container image. The operations include extracting at least one identifier from the command. Further, the operations include identifying the at least one identifier in manifest information of each container image of a set of container images. The operations include detecting the source container image from the set of container images based on the identification of the at least one identifier in the manifest information. The set of container images includes the source container image. The manifest information associated with the detected source container image includes the at least one identifier. The operations include detecting the at least one source data layer of the source container image based on the detection of the source container image. The operations include synchronizing the detected at least one source data layer with the target data layer of the target container image.

Additional technical features and benefits are realized through the techniques of the disclosure. Embodiments and aspects of the disclosure are described in detail herein and are considered a part of the claimed subject matter. For a better understanding, refer to the detailed description and the drawings.

BRIEF DESCRIPTION OF THE DRAWINGS

The following description will provide details of preferred embodiments with reference to the following figures wherein.

DETAILED DESCRIPTION

Figure 1:
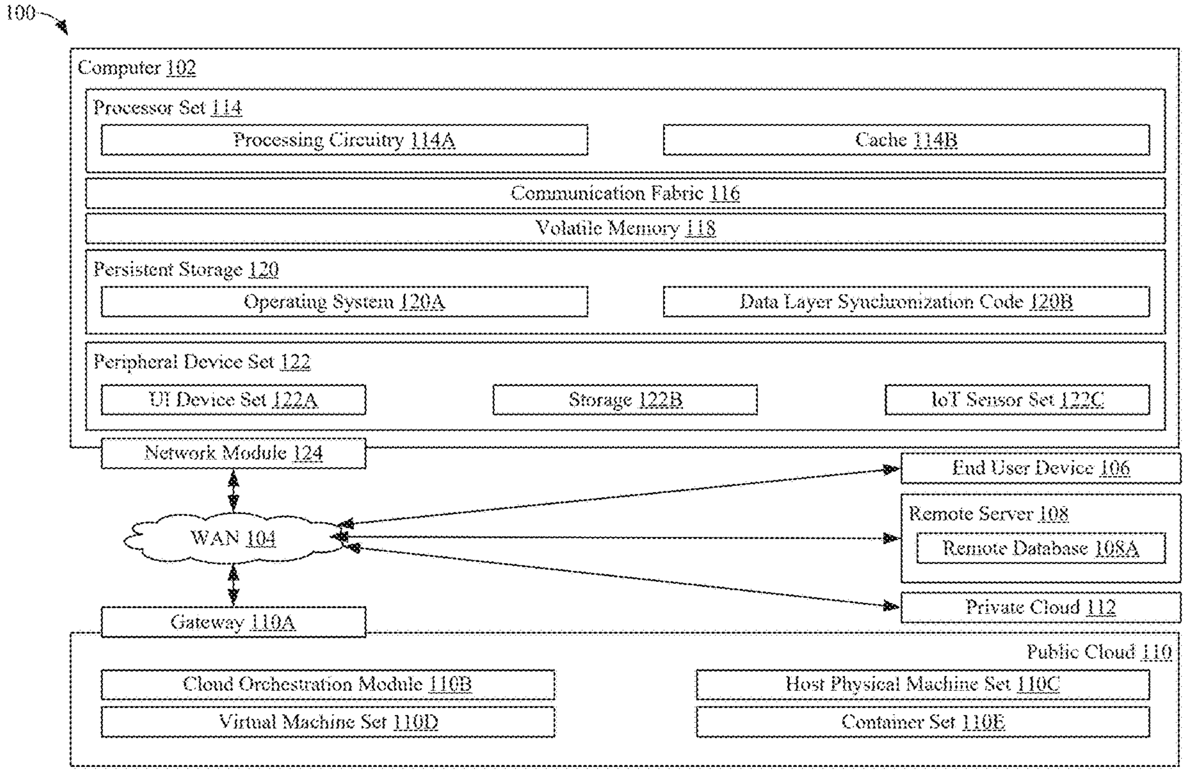
FIG. 1 is a diagram that illustrates a computing environment for the management of data layer synchronization for container images, in accordance with an embodiment of the disclosure.

With the advancements in cloud computing, containerization technology has transformed the landscape of application development and application deployment. When committing a container image using containerization technology, all contents of the container image's layers are packaged and pushed to a repository, forming a complete container image. Conversely, when pulling the container image, users must download not only the specified image data layers but also all parent layers to their local environments. This process results in the upload and download of all data layers of the image, which can be cumbersome and time-consuming, especially in enterprise settings where speed and time are crucial.

As software products evolve, the software products frequently require updates, including new features and critical security patches. For enterprise-level users, the urgency to install security fixes is paramount to mitigate exposure to security vulnerabilities. High-severity vulnerabilities, often identified by Common Vulnerabilities and Exposures (CVE) numbers, necessitate security patches to be delivered swiftly (e.g., within a 24-hour window) to multiple images. The challenge lies in the fact that service providers often lack sufficient time to navigate the entire lifecycle of software updates, which includes building binaries, testing, and delivering the required updates. The fast-growing demand for updating software applications cannot be met using traditional container image management. Service providers find it difficult to keep up with the requirement to quickly fix security issues across different services, components, and products.

To address these issues, there is a need for a faster and efficient automated computing system to share the security patches across the multiple container images.

The proposed system manages security patches for the multiple container images by allowing source data layers (interchangeably called at least one source data layer) to be used across the multiple container images. The source data layers are components of a container image that can be reused across the multiple container images. The proposed system can obtain source layer content associated with the source data layers from container images stored in a repository using a command. As a result, if a security patch is required, the source layer content including the security patch can be used across different container images, allowing organizations to quickly apply high-priority CVE fixes. This approach is easy and efficient for both developers and users to adopt, as it does not require them to change their existing processes. Further, the seamless integration with the existing processes, reusable source data layers, and streamlined patch management capabilities saves time for the organizations making this approach easy and efficient for both developers and users. By reusing patched source data layers, organizations can strengthen their production environments and reduce the time they are exposed to security vulnerabilities. The proposed system allows organizations to efficiently handle container image updates through data layers, particularly for security patches. When a security vulnerability (like a CVE) needs to be addressed, instead of updating each container image individually, the proposed system enables the reuse of patched layers across multiple container images. This is accomplished through a simple command-based process that automatically synchronizes the required security updates across different images.

In various embodiments of the disclosure, a computer-implemented method for managing data layer synchronization for container images is described. The computer-implemented method includes receiving a command for synchronizing at least one source data layer of a source container image with a target data layer of a target container image. The computer-implemented method further includes extracting at least one identifier from the command. Further, the computer-implemented method includes identifying the at least one identifier in manifest information of each container image of a set of container images. The computer-implemented method further includes detecting the source container image from the set of container images based on the identification of the at least one identifier in the manifest information. The set of container images includes the source container image. The manifest information associated with the detected source container image includes the at least one identifier. The computer-implemented method further includes detecting the at least one source data layer of the source container image based on the detection of the source container image. The computer-implemented method includes synchronizing the detected at least one source data layer with the target data layer of the target container image.

In various embodiments of the disclosure, the computer-implemented method further includes determining, by the computer, source manifest information associated with the source container image based on the detection of the at least one source data layer. The computer-implemented method further includes generating, by the computer, a target manifest field based on the source manifest information. The target manifest field is associated with the target manifest information of the target container image. Further, the target manifest field includes one or more references to the at least one source data layer.

In various embodiments of the disclosure, the computer-implemented method includes detecting the availability of source layer content associated with the at least one source data layer in a source repository. The availability of the source layer content in the source repository is detected based on the source manifest information. Further, the computer-implemented method includes obtaining, by the computer, one or more source attributes associated with the at least one source data layer based on the source manifest information and the detection of the availability of the source layer content. The one or more source attributes correspond to first metadata associated with the at least one source data layer of the source container image. The computer-implemented method further includes generating, by the computer, the target manifest field for the target data layer based on the one or more source attributes. A set of target data layers of the target container image includes the target data layer. Further, the computer-implemented method includes storing, by the computer, the target manifest field in a target repository.

In various embodiments of the disclosure, the computer-implemented method includes obtaining, by the computer, the target manifest field from the target repository. Further, the computer-implemented method includes extracting, by the computer, the one or more source attributes from the obtained target manifest field. Further, the computer-implemented method includes obtaining, by the computer, the at least one source data layer from the source repository based on the extracted one or more source attributes. Furthermore, the computer-implemented method includes extracting, by the computer, the source layer content from the obtained at least one source data layer. Furthermore, the computer-implemented method includes integrating, by the computer, the extracted source layer content into the target data layer.

In various embodiments of the disclosure, the source manifest information includes a structure of the at least one source data layer and a set of characteristics of the at least one source data layer.

In various embodiments of the disclosure, the target manifest information includes a configuration of each target data layer of the set of target data layers and one or more characteristics associated with each target data layer of the set of target data layers. The one or more characteristics include at least one of a size of the set of the set of target data layers, a version of the set of target data layers, a digest of the set of target data layers, or a base image of the set of target data layers.

In various embodiments of the disclosure, the one or more source attributes include at least one of a digest of the at least one source data layer, a differential number of the at least one source data layer, an availability status of the at least one source data layer, a version of the at least one source data layer, or the at least one identifier.

In various embodiments of the disclosure, the at least one identifier corresponds to a reference for at least one vulnerability in the target container image. The at least one identifier includes at least one of Common Vulnerabilities and Exposures (CVE) of the at least one vulnerability or a bug identifier number of the at least one vulnerability.

In various embodiments of the disclosure, a computer system for managing data layer synchronization for container images is described. The computer system includes a processor set, one or more computer-readable storage media, and program instructions stored on the one or more computer-readable storage media. The program instructions executable by the processor set to cause the processor set to receive a command to synchronize at least one source data layer of a source container image with a target data layer of a target container image. The program instructions are executable by the processor set to cause the processor set to extract at least one identifier from the command. Further, the program instructions executable by the processor set to cause the processor set to identify the at least one identifier in manifest information of each container image of a set of container images. The program instructions executable by the processor set to cause the processor set to detect the source container image from the set of container images based on the identification of the at least one identifier in the manifest information. The set of container images includes the source container image. The manifest information associated with the detected source container image includes the at least one identifier. The program instructions executable by the processor set to cause the processor set to obtain a shared layer attribute from the source container image. The shared layer attribute corresponds to second metadata used to detect the at least one source data layer within a source repository. Further, the program instructions executable by the processor set to cause the processor set to detect the at least one source data layer of an original source container image in the source repository. The at least one source data layer is detected based on the shared layer attribute. Furthermore, the program instructions executable by the processor set to cause the processor set to synchronize the detected at least one source data layer with the target data layer of the target container image.

In various embodiments of the disclosure, the program instructions executable by the processor set to cause the processor set to determine source manifest information associated with the original source container image based on the detection of the at least one source data layer. Further, the program instructions executable by the processor set to cause the processor set to generate a target manifest field based on the source manifest information. The target manifest field is associated with target manifest information of the target container image. Further, the target manifest field includes one or more references to the at least one source data layer.

In various embodiments of the disclosure, the program instructions executable by the processor set to cause the processor set to detect an availability of source layer content associated with the at least one source data layer in the source repository. The availability of the source layer content in the source repository is detected based on the source manifest information. The program instructions executable by the processor set to cause the processor set to obtain one or more source attributes associated with the at least one source data layer based on the source manifest information and the detection of the availability of the source layer content. The one or more source attributes correspond to first metadata associated with the at least one source data layer of the original source container image. Further, the program instructions executable by the processor set to cause the processor set to generate the target manifest field for the target data layer based on the one or more source attributes. A set of target data layers of the target container image includes the target data layer. The program instructions executable by the processor set to cause the processor to store the target manifest field in a target repository.

In various embodiments of the disclosure, the program instructions executable by the processor set to cause the processor set to obtain the target manifest field from the target repository. Further, the program instructions executable by the processor set to cause the processor set to extract the one or more source attributes from the obtained target manifest field. Furthermore, the program instructions executable by the processor set to cause the processor set to obtain the at least one source data layer from the source repository based on the extracted one or more source attributes. The program instructions executable by the processor set to cause the processor set to extract the source layer content from the obtained at least one source data layer. The program instructions executable by the processor set to cause the processor set to integrate the extracted source layer content into the target data layer.

In various embodiments of the disclosure, the source manifest information includes a structure of the at least one source data layer and a set of characteristics of the at least one source data layer.

In various embodiments of the disclosure, the target manifest information includes a configuration of each target data layer of the set of target data layers and one or more characteristics associated with each target data layer of the set of target data layers. The one or more characteristics include at least one of a size of the set of the set of target data layers, a version of the set of target data layers, a digest of the set of target data layers, or a base image of the set of target data layers.

In various embodiments of the disclosure, the one or more source attributes include at least one of a digest of the at least one source data layer, a differential number of the at least one source data layer, an availability status of the at least one source data layer, a version of the at least one source data layer, or the at least one identifier.

In various embodiments of the disclosure, the at least one identifier corresponds to a reference for at least one vulnerability in the target container image. The at least one identifier includes at least one of Common Vulnerabilities and Exposures (CVE) of the at least one vulnerability or a bug identifier number of the at least one vulnerability.

In various embodiments of the disclosure, a computer program product for managing data layer synchronization for container images is described. The computer program product includes one or more computer-readable storage medium and program instructions stored on the one or more computer-readable storage media to perform operations. The operations include receiving a command for synchronizing at least one source data layer of a source container image with a target data layer of a target container image. The operations include extracting at least one identifier from the command. Further, the operations include identifying the at least one identifier in manifest information of each container image of a set of container images. The operations include detecting the source container image from the set of container images based on the identification of the at least one identifier in the manifest information. The set of container images includes the source container image. The manifest information associated with the detected source container image includes the at least one identifier. The operations include detecting the at least one source data layer of the source container image based on the detection of the source container image. The operations include synchronizing the detected at least one source data layer with the target data layer of the target container image.

In various embodiments of the disclosure, the program instructions stored on the one or more computer-readable storage media perform operations including determining source manifest information associated with the source container image based on the detection of the at least one source data layer. The operations also include generating a target manifest field based on the source manifest information. The target manifest field is associated with target manifest information of the target container image. The target manifest field includes one or more references to the at least one source data layer.

In various embodiments of the disclosure, the program instructions stored on the one or more computer-readable storage media perform operations including detecting an availability of source layer content associated with the at least one source data layer in a source repository. The availability of the source layer content in the source repository is detected based on the source manifest information. Further, the operations include obtaining one or more source attributes associated with the at least one source data layer based on the source manifest information and the detection of the availability of the source layer content. The one or more source attributes correspond to first metadata associated with the at least one source data layer of the source container image. The operations also include generating the target manifest field for the target data layer based on the one or more source attributes. A set of target data layers of the target container image includes the target data layer. The operations also include storing the target manifest field in a target repository.

In various embodiments of the disclosure, the program instructions stored on the one or more computer-readable storage media perform operations including obtaining the target manifest field from the target repository. Further, the operations include extracting the one or more source attributes from the obtained target manifest field. The operations also include obtaining the at least one source data layer from the source repository based on the extracted one or more source attributes. The operations include extracting the source layer content from the obtained at least one source data layer. Furthermore, the operations include integrating the extracted source layer content into the target data layer.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium is an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or freely propagating electromagnetic waves, electromagnetic waves propagating through a waveguide, light pulses passing through a fiber optic cable, electrical signals communicated through a wire, and/or additional transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for the management of data layer synchronization for container images, in accordance with an embodiment of the disclosure. With reference to FIG. 1, there is shown a computing environment 100 that contains an example of an environment for the execution of at least some of the computer code involved in performing the disclosed methods, such as data layer synchronization code 120B. In addition to the data layer synchronization code 120B for vehicle cloning determination, computing environment 100 includes, for example, a computer 102, a wide area network (WAN) 104, an end-user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the data layer synchronization code 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch, a robot, a wearable computer, a mainframe computer, a quantum computer, or any additional form of a computer or a mobile device now known or to be developed in the future that is capable of running a program, accessing a network or querying a database, such as a remote database 108A. As is well understood in the art of computer technology, and depending upon the technology, the performance of a computer-implemented method is distributed among multiple computers and/or between multiple locations. On the other hand, in this presentation of the computing environment 100, detailed discussion is focused on a single computer, specifically the computer 102, to keep the presentation as simple as possible. The computer 102 is located in a cloud, even though it is not shown in a cloud in FIG. 1. On the other hand, computer 102 is not required to be in a cloud except to any extent as is affirmatively indicated.

The processor set 114 includes one, or more, computer processors of any type now known or to be developed in the future. The processing circuitry 114A is distributed over multiple packages, for example, multiple, coordinated integrated circuit chips. The processing circuitry 114A may implement multiple processor threads and/or multiple processor cores. The cache 114B is a memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 is located "off-chip." In some computing environments, the processor set 114 is designed for working with qubits and performing quantum computing.

Computer readable program instructions are typically loaded onto the computer 102 to cause a series of operations to be performed by the processor set 114 of the computer 102 and thereby affect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in several types of computer-readable storage media, such as the cache 114B and additional storage media discussed below. The program instructions, and associated data, are accessed by the processor set 114 to control and direct the performance of the disclosed methods. In computing environment 100, at least some of the instructions for performing the disclosed methods are stored in the dynamic modification of the data layer synchronization code 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Multiple types of signal communication paths are used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 is distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 is a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the data layer synchronization code 120B typically includes at least some of the computer code involved in performing the disclosed methods.

The peripheral device set 122 includes the set of peripheral devices of computer 102. Data communication connections between the peripheral devices and additional components of computer 102 are implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B is persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage is provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor is a thermometer, and additional sensor is a motion detector.

The network module 124 is the collection of computer software, hardware, and firmware that allows computer 102 to communicate with multiple computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In some embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 is replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through the WAN 104 to EUD 106. In this way, the EUD 106 can display, or present recommendations to an end user. In some embodiments of the disclosure, EUD 106 is a client device, such as a thin client, heavy client, mainframe computer, desktop computer, and so on.

The remote server 108 is any computer system that serves at least some data and/or functionality to the computer 102. The remote server 108 is controlled and used by the same entity that operates the computer 102. The remote server 108 represents the machine(s) that collect and store helpful and useful data for use by multiple computers, such as the computer 102. For example, in a hypothetical case where the computer 102 is designed and programmed to provide a recommendation based on historical data, then this historical data is provided to the computer 102 from the remote database 108A of the remote server 108.

The public cloud 110 is any computer system available for use by multiple entities that provides on-demand availability of computer system resources and/or additional computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs are stored as images and are transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through the WAN 104.

VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in some embodiments of the disclosure, a private cloud is disconnected from the internet entirely and only accessible through a local/private network. A hybrid cloud is a composition of multiple clouds of diverse types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
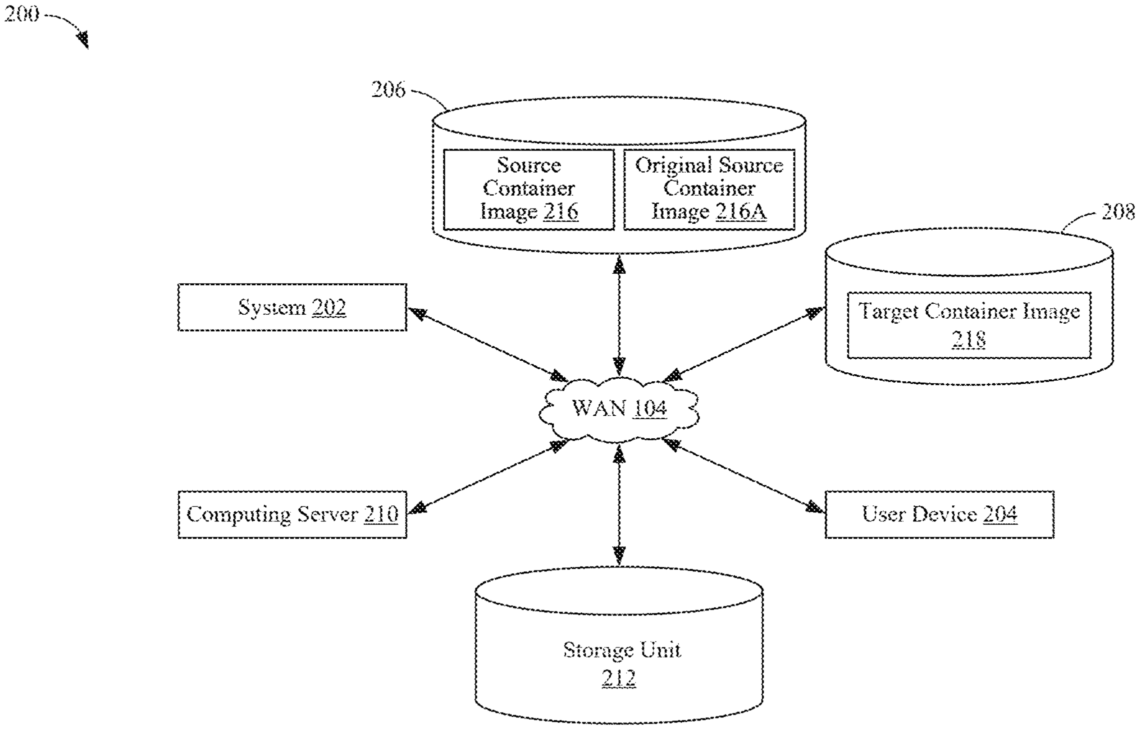
FIG. 2 is a diagram that illustrates a network environment for the management of the data layer synchronization for the container images, in accordance with an embodiment of the disclosure.

FIG. 2 is a diagram that illustrates a network environment for the management of the data layer synchronization for the container images, in accordance with an embodiment of the disclosure. FIG. 2 is explained in conjunction with elements from FIG. 1. With reference to FIG. 2, there is shown a diagram of the network environment 200. The network environment 200 includes a system 202, a user device 204, a source repository 206, a target repository 208, and a computing server 210. Further, the network environment 200 also includes a storage unit 212, such as an internal storage unit and an external storage unit. The network environment 200 further includes a WAN 104 of FIG. 1. In an embodiment of the disclosure, the system 202 is an exemplary embodiment of the computer 102 in FIG. 1.

The system 202 may include suitable logic, circuitry, interfaces, and/or code that is configured for the management of the data layer synchronization for the container images. In an embodiment of the disclosure, the container images are packaged executable files including a set of components required to run an application. For example, the set of components may include an application code, a set of libraries, and a set of dependencies associated with the application. Further, the data layers correspond to individual components that are combined to form a container image. Further, each data layer represents a set of changes or additions, allowing for efficient storage, reuse, and management of the application's components.

The system 202 may include suitable logic, circuitry, interfaces, and/or code that is configured for the management of the data layer synchronization for the container images. The system 202 is configured to receive a command for synchronizing at least one source data layer of a source container image 216 with a target data layer of a target container image 218. In an embodiment of the disclosure, the system 202 receives the command from the user device 204. Further, the source container image 216 is a container image stored in the source repository 206 that includes the at least one source data layer required to be synchronized with the target container image 218. In an embodiment of the disclosure, the target container image 218 is a container image stored in the target repository 208. Further, the target container image 218 corresponds to a container image that may receive source layer content associated with the at least one source data layer from the source container image 216. Further, the system 202 is configured to extract at least one identifier from the command. For example, the at least one identifier corresponds to a reference for at least one vulnerability in the target container image 218. Details on the at least one identifier have been explained with reference to at least FIG. 4, FIG. 5, FIG. 6, and FIG. 9A.

Further, the system 202 is configured to identify the at least one identifier in manifest information of each container image of a set of container images. In an embodiment of the disclosure, the manifest information of each container image of the set of container images includes metadata about the set of container images. For example, the metadata may include details about data layers of the set of container images, configurations of the set of container images, and dependencies of the set of container images. By cross-referencing the at least one identifier with the manifest information, the system 202 may determine which container images include the relevant source data layers. Furthermore, the system 202 is configured to detect the source container image 216 from the set of container images based on the identification of the at least one identifier in the manifest information. The set of container images includes the source container image. In an embodiment of the disclosure, the manifest information associated with the detected source container image 216 includes the at least one identifier. The detection of the source container image 216 ensures that the system 202 knows which container image includes the at least one source data layer that is required to be synchronized with the target data layer. Furthermore, the system 202 is configured to detect the at least one source data layer of the source container image 216 based on the detection of the source container image 216. The at least one source data layer includes the information that is required to be synchronized with the target data layer of the target container image 218. The system 202 is further configured to synchronize the detected at least one source data layer with the target data layer of the target container image 218 based on the target manifest field. The synchronization of the at least one source data layer with the target data layer ensures that the target container image 218 is updated with the required data from the source container image 216. Details on synchronizing the at least one source data layer of the source container image 216 with the target data layer have been explained with reference to, for example, FIG. 5.

In an embodiment of the disclosure, each of the user device 204, the source repository 206, and the target repository 208 is connected independently to the system 202 using the WAN 104, such as 5G, 6G, and future wireless networks. This individual connectivity facilitates seamless and efficient data exchange between the system 202 and each of the user device 204, the source repository 206, and the target repository 208, allowing for real-time communication and the timely updating of data. By leveraging advanced wireless technologies such as 5G, 6G, and future networks, the system 202 can accommodate high data throughput and low latency, ensuring that data synchronization processes are executed with minimal delay and high reliability. This enables the system 202 to handle large volumes of data packets efficiently, support concurrent connections from multiple endpoints, and maintain data integrity during transmission, thereby optimizing the performance of distributed applications and enhancing the overall responsiveness of an architecture of the system 202.

Further, the user device 204 includes suitable logic, circuitry, interfaces, and/or code configured to input and transmit the command to the system 202, for the synchronization of the at least one source data layer of the source container image 216 with the target data layer of the target container image 218. In an embodiment of the disclosure, the user device 204 is associated with a user. The user uses the user device 204 to input and transmit the command to the system 202. For example, the user may be a system administrator, a software developer, a cloud service provider, a cybersecurity professional, and the like. Further, the user device 204 ensures efficient communication with the system 202 through connectivity technologies like WAN, thereby supporting timely and secure data exchange. The user device 204 is communicatively coupled with the system 202 via the WAN 104. In an embodiment of the disclosure, the user device 204 is an exemplary embodiment of the EUD 106. Examples of the user device 204 may include, but are not limited to, a computing device, a smartphone, a mainframe machine, a server, a computer workstation, a cellular phone, a mobile phone, a gaming device, a consumer electronic (CE) device, a desktop computer, a laptop, a head-mounted device (HMD), and/or any additional electronic device. In an embodiment of the disclosure, the system 202 is implemented in the computing server 210. In an embodiment of the disclosure, the system 202 is implemented in the user device 204.

In an embodiment of the disclosure, a display screen of the user device 204 may include suitable logic, circuitry, and interfaces configured to receive the command. Further, the display screen provides a user-friendly interface where a user may input the command for the synchronization of the at least one source data layer of the source container image 216 with the target data layer of the target container image 218. In an embodiment of the disclosure, the display screen may refer to a display screen of the smartphone, a display screen of the laptop, a display screen of the desktop computer, a display screen of a smart-glass device, a see-through display, a projection-based display, an electro-chromic display, or a transparent display. In an embodiment of the disclosure, the display screen is realized through several known technologies such as, but are not limited to, a Liquid Crystal Display (LCD) display, a Light Emitting Diode (LED) display, a plasma display, or an Organic LED (OLED) display technology, or additional display devices.

In an embodiment of the disclosure, the computing server 210 is implemented as a cloud server and may execute operations through web applications, cloud applications, HTTP requests, repository operations, file transfer, and the like. Further, exemplary implementations of the computing server 210 include, but are not limited to, a database server, a file server, a web server, a media server, an application server, a mainframe server, or a cloud computing server.

In an embodiment of the disclosure, the computing server 210 is implemented as a plurality of distributed cloud-based resources by use of several technologies that are well known to those ordinarily skilled in the art. A person with ordinary skill in the art will understand that the scope of the disclosure may not be limited to the implementation of the computing server 210 and the system 202 as two separate entities. In certain embodiments, the functionalities of the computing server 210 can be incorporated in its entirety or at least partially in the system 202, without a departure from the scope of the disclosure.

In an embodiment of the disclosure, the storage unit 212 is configured to store an organized collection of data. The organized collection of data can be accessed electronically from a computer system (such as the system 202). In an embodiment of the disclosure, the storage unit 212 is communicatively coupled to the user device 204. The storage unit 212 communicatively coupled to the user device 204 is configured to store various types of data related to the synchronization process. The storage unit 212 securely stores the command, including the at least one identifier. Additionally, the storage unit 212 stores one or more source attributes. Details on the one or more source attributes have been explained with reference to, for example, FIG. 5 and FIG. 9A.

In an embodiment of the disclosure, the storage unit 212 is communicatively coupled to the system 202 via the WAN 104. The storage unit 212 communicatively coupled to the system 202 stores data generated during the synchronization processes. The storage unit 212 enhances the capacity of the system 202 to archive the command and the one or more source attributes. By leveraging the storage unit 212, the system 202 may be able to manage larger volumes of data effectively. Further, the storage unit 212 is designed to manage, store, retrieve, and update data efficiently. The structure of the storage unit 212 involves tables, records, and fields that can be managed through various database management systems (DBMS). Examples of the storage unit 212 unit may include, but are not limited to, a relational database, a Non-Structured Query Language (SQL) database, a hierarchical database, a network database, a transactional database, a data warehouse, a distributed database, and a data lake.

In various embodiments of the disclosure, the system 202 is configured to receive the command to synchronize the at least one source data layer from the source container image 216 with the target data layer of the target container image 218. For example, the command indicates that the user wants to synchronize updates related to the specific vulnerability identified by the Common Vulnerabilities and Exposures (CVE) number. Further, the system 202 is configured to extract the at least one identifier from the command. For example, the command includes the at least one identifier such as Common Vulnerabilities and Exposures (CVE)-2024-12345, which refers to a specific vulnerability in the target container image 218. Furthermore, the system is configured to identify the at least one identifier in the manifest information of each container image of the set of container images. The system 202 is further configured to detect the source container image 216 from the set of container images based on the identification of the at least one identifier in the manifest information. The set of container images includes the source container image 216. For example, after examining the manifest information, the system 202 detects that CVE-2024-12345 is listed in the manifest information of the app:production image. This confirms that the app:production image is the source container image 216 which includes the vulnerability that is required to be addressed.

Further, the system 202 is configured to obtain a shared layer attribute from the source container image 216. In an embodiment of the disclosure, the shared layer attribute corresponds to second metadata used to detect the at least one source data layer within the source repository. For instance, the system 202 obtains the shared layer attribute such as sha256:abc123, which uniquely identifies the at least one source data layer associated with the vulnerability. The system 202 is further configured to detect the at least one source data layer of an original source container image 216A in the source repository 206. In various embodiments of the disclosure, the original source container image 216A may be stored in the source repository 206 or any additional repository. In an embodiment of the disclosure, the at least one source data layer is detected based on the shared layer attribute. In an embodiment of the disclosure, the original source container image 216A is a container image that includes the at least one source data layer. Further, the at least one source data layer includes updates or modifications that are required to be propagated to the target container image 218. Furthermore, the system 202 is configured to synchronize the detected at least one source data layer with the target data layer of the target container image 218.

In operation, the system 202 is configured to receive the command for synchronizing the at least one source data layer of the source container image 216 with the target data layer of the target container image 218. For example, the user may decide to update the target container image 218 (e.g., App_Version_2) with the latest data from the source container image 216 (e.g., App_Version_1). Upon receiving the command, the system 202 is configured to extract the at least one identifier from the command. For example, the command includes the at least one identifier such as CVE-2024-12345, which refers to a specific vulnerability in the target container image 218. The at least one identifier is used for tracking and addressing security issues. Further, the system 202 is configured to identify the at least one identifier in manifest information of each container image of the set of container images. The system 202 scans the manifest information of the set of container images (e.g., app:vulnerable image, app:staging image, app:production image) to locate CVE-2024-12345. The manifest information includes the metadata of the set of container images. After scanning the manifest information, the system 202 detects that CVE-2024-12345 is listed in the manifest information of the source container image 216 (e.g., the app:production image) from the set of container images. This confirms that the app:production image is the source container image 216 which includes the updates associated with the vulnerability. Further, the system 202 is configured to detect the at least one source data layer of the source container image 216 based on the detection of the source container image 216. For example, the system 202 identifies that the vulnerability CVE-2024-12345 is linked to a specific data layer in the app:production image, which includes the updates for mitigating the vulnerability. The system 202 is further configured to synchronize the detected at least one source data layer with the target data layer of the target container image 218. This ensures that the target container image 218 is now secure and free from the vulnerabilities referenced by CVE-2024-12345.

Figure 3:
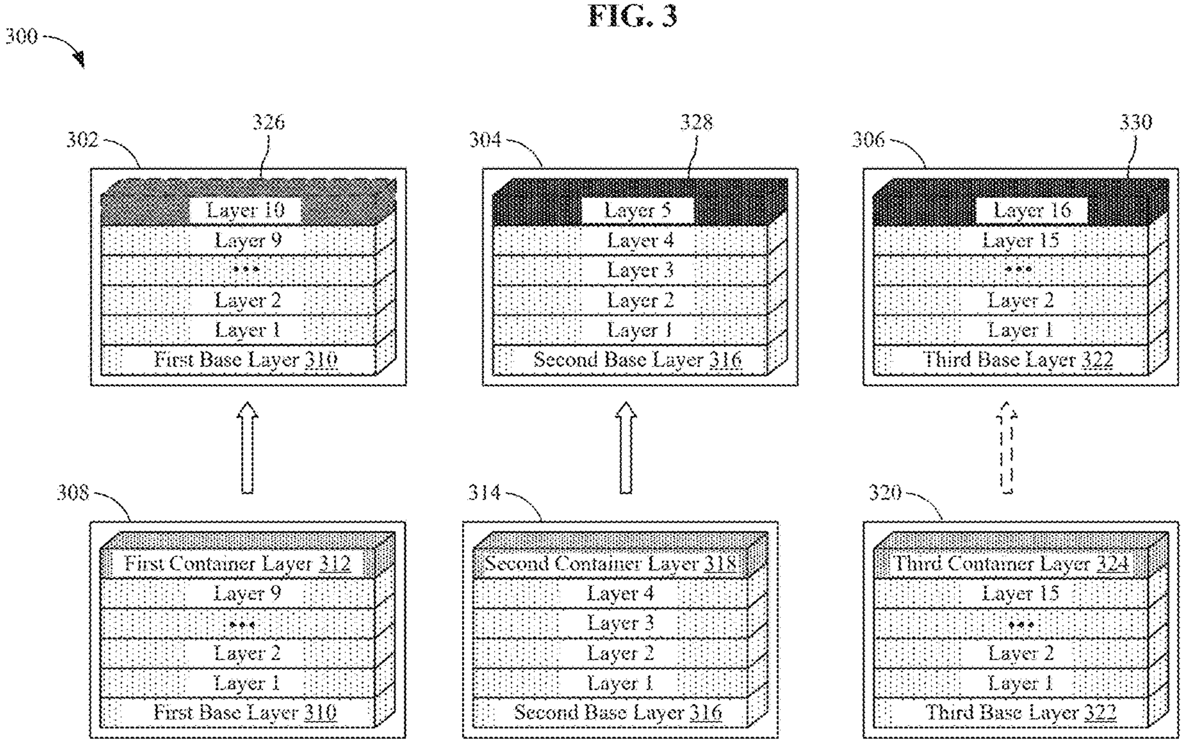
FIG. 3 is a diagram that illustrates a pictorial depiction of the management of the data layer synchronization for the container images, in accordance with an embodiment of the disclosure.

FIG. 3 is a diagram that illustrates a pictorial depiction of the management of the data layer synchronization for the container images, in accordance with an embodiment of the disclosure. FIG. 3 is explained in conjunction with elements from FIG. 1, and FIG. 2. With reference to FIG. 3, the pictorial depiction represents a multi-repository architecture 300 (also called architecture) designed to facilitate efficient management and distribution of security patches across multiple container images. The architecture includes a first repository 302, a second repository 304, and a third repository 306. In an embodiment of the disclosure, each of the first repository 302, the second repository 304, and the third repository 306 includes a container image. Further, the architecture also includes a first container 308 including a first base layer 310 that serves as a foundation for the first container 308, and layer 1 to layer 9. The layer 1 to layer 9 of the first container 308 represent additional application-specific layers that are built upon the first base layer 310, providing required functionalities and dependencies. Further, the first container 308 includes a first container layer 312 that is writable layer which sits on the top of all the previous image layers, and any runtime configurations associated with the first container 308.

Further, the architecture also includes a second container 314 including a second base layer 316 similar to the first base layer 310 associated with the first container 308. The second container 314 includes layer 1 to layer 5, and a second container layer 318. The layer 1 to layer 5 provide extensive functionalities required for the application. For example, the extensive functionalities may include core application logic, user interface components, data management functionality, and the like. Further, the second container layer 318 is writable layer which sits on the top all the previous image layers inside the second container 314. In an embodiment of the disclosure, the second repository 304 corresponds to an internal repository of the system 202, such as the storage unit 212 of FIG. 2. The architecture also includes a third container 320 including a third base layer 322 that functions as the foundational layer for the third container 320. The third container 320 also includes layer 1 to layer 15, which includes various components required for the application's operation. Furthermore, the third container 320 includes a third container layer 324 that that is writable layer which sits on the top of image layers with the third container 320. In an embodiment of the disclosure, the third repository 306 corresponds to a trusted public repository.

Furthermore, the first repository 302 includes a first container image 326 including a set of first elements of the first container 308, such as the first base layer 310 and the layer 1 to the layer 9. The first repository 302 also includes an additional layer e.g., a layer 10. The layer 10 is the target data layer, which is currently vacant and created to receive updates for security patches. Further, the second repository 304 includes a second container image 328 including a set of second elements of the second container 314, such as the second base layer 316 and the layer 1 to the layer 4. The second repository 304 also includes an additional layer e.g., a layer 5. (e.g., the at least one source data layer). In an embodiment of the disclosure, the layer 5 incorporates a critical security patch designed to address a high-severity Common Vulnerability and Exposure (CVE). Furthermore, the third repository 306 includes a third container image 330 including a set of third elements of the third container 320, such as the third base layer 322 and the layer 1 to the layer 15. The third repository 306 also includes an additional layer e.g., a layer 16 (e.g., the at least one source data layer). In an embodiment of the disclosure, the layer 16 also incorporates the critical security patch designed to address the CVE.

In the context of software deployment, timely delivery of security patches is crucial, particularly when addressing vulnerabilities classified as high severity, such as the high severity CVE. The challenge arises when a security patch, developed for one container image, needs to be propagated to over 100 additional images across multiple repositories within a limited timeframe. The traditional patch management lifecycle, which includes packaging, testing, and delivery, can lead to significant delays, leaving numerous container images vulnerable to exploitation during the update process. The system 202 streamlines the patch delivery process by leveraging a structured approach to security updates.

To address the need for rapid distribution of the same security patch to multiple images, the system 202 is configured to synchronize the security path with the vacant target data layer (layer 10 in the first container image 326) to implement the security fixes. The security patch may be obtained from the layer 5 of the second container image 328 or the layer 16 of the third container image 330. This allows the system 202 to efficiently deploy the same security patch (e.g., across various container images without the need for extensive modifications to existing layers. By implementing this architecture, the system 202 ensures that security patches can be swiftly and effectively delivered to all affected container images, significantly reducing the vulnerability window and enhancing the overall security posture of the applications. This efficient patch management strategy not only improves responsiveness to security threats but also minimizes disruption in the operational environment, allowing efficient patch management to be used for maintaining the integrity and security of containerized applications across diverse repositories.

By enabling multiple container images to share the same underlying infrastructure, the system 202 optimizes resource utilization and reduces the need for redundant hardware, leading to a smaller physical footprint and cost-effective scalability. Additionally, the lightweight nature of containers compared to traditional virtual machines allows for better memory management, as they share the same operating system kernel, thereby resulting in reduced memory overhead. This dynamic allocation of resources enables real-time updates through target data layers, improving the overall performance of the system 202 and reducing latency during data operations. The lightweight nature of containers refers to their small size and efficient resource utilization compared to traditional virtual machines. Containers package only the application and its dependencies, without the need for a full operating system, as required by virtual machines. This makes the containers smaller in size and more efficient in their use of system resources, such as memory and CPU. In contrast to traditional computing systems, which often face challenges with timely patch management due to sequential update processes, the architecture of the system 202 facilitates rapid and efficient distribution of security patches. By leveraging parallel processing capabilities, the system 202 allows for simultaneous updates across multiple container images, minimizing downtime and enhancing security response times. Furthermore, the cost efficiency and operational agility of the system 202 significantly outperform traditional environments, which typically require extensive reconfiguration and longer wait times for updates. Overall, this multi-repository approach not only streamlines security management but also supports the integrity and security of containerized applications.

Figure 4:
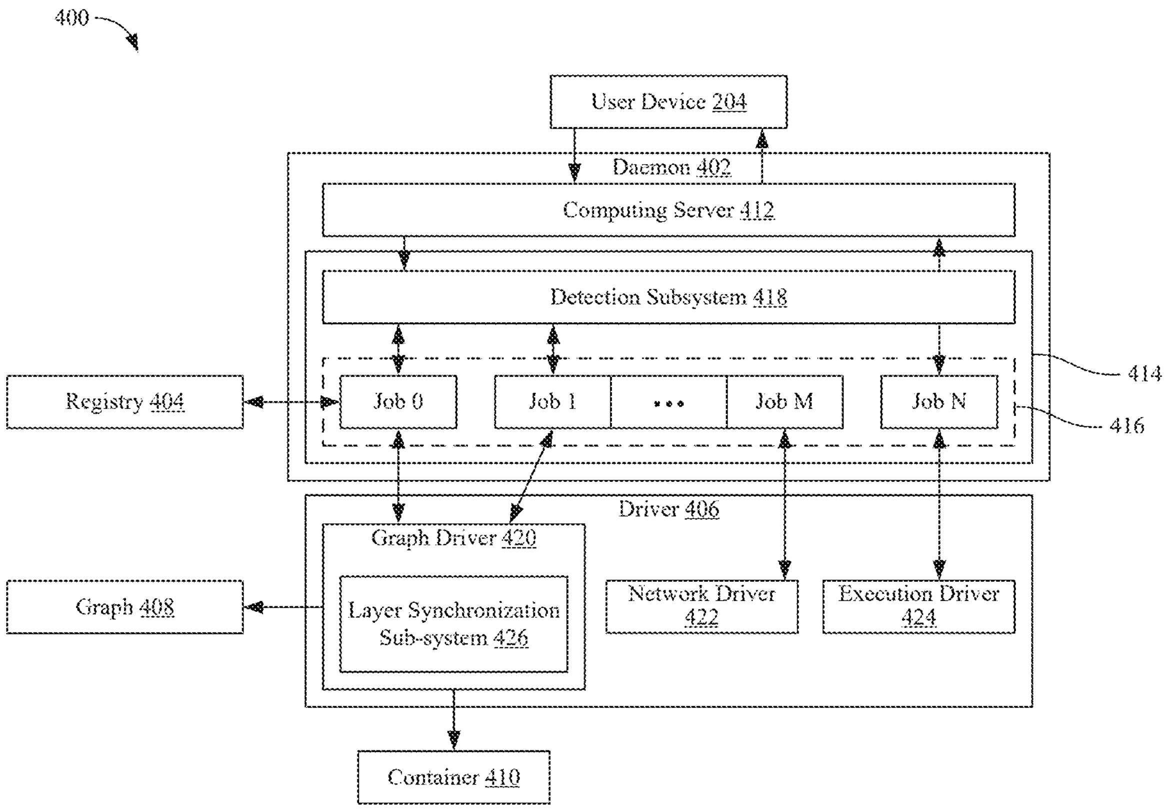
FIG. 4 is a diagram that illustrates a system-level architecture of a system for the management of the data layer synchronization for the container images, in accordance with an embodiment of the disclosure.

FIG. 4 is a diagram that illustrates a system-level architecture of the system 202 for the management of the data layer synchronization for the container images, in accordance with an embodiment of the disclosure. FIG. 4 is explained in conjunction with elements from FIG. 1, FIG. 2, and FIG. 3. As shown in FIG. 4, the system-level architecture 400 includes the user device 204, a daemon 402, a registry 404, a driver 406, a graph 408, and an image container 410.

In an embodiment of the disclosure, the system 202 receives the command using the user device 204 to initiate the synchronization of container images. For example, build <image-name>:<tag> shared <CVE-number> introduces new functionality in docker for managing source data layers between container images. The CVE number indicates that the target container image 218 includes a cybersecurity vulnerability identified by the CVE number. The command addresses the cybersecurity vulnerability in the target container image 218 by synchronizing the detected at least one source data layer with the target data layer of the target container image 218, ensuring that users have access to the latest versions of the target container image 218. The daemon 402 is a core service running on a host machine that manages containers. Further, the daemon 402 includes a set of components, such as a computing server 412 (similar to the computing server 210 of FIG. 2) and a computing engine 414. The computing engine 414 includes a set of jobs 416 (Job 0 to Job N), and a detection sub-system 418. The computing server 412 acts as the interface for processing the command from the user device 204.

In an embodiment of the disclosure, the detection sub-system 418 is a component of the system. The detection sub-system 418 is configured to receive the command from the user via the user device 204. Further, the detection sub-system 418 extracts the at least one identifier from the command and identifies the at least one identifier in the manifest information of each container image of the set of container images. In an embodiment of the disclosure, the manifest information is a detailed description of the data layers of each container image of the set of container images, configurations of each container image of the set of container images, and metadata of each container image of the set of container images. The detection sub-system 418 also detects the source container image 216 from the set of container images based on the identification of the at least one identifier in the manifest information. The set of container images includes the source container image 216. In an embodiment of the disclosure, the manifest information associated with the detected source container image 216 includes the at least one identifier. The detection sub-system 418 also detects the at least one source data layer of the source container image 216 based on the detection of the source container image 216. Furthermore, the set of jobs 416 represents tasks or processes managed by the computing engine 414. The set of jobs 416 interacts with the detection sub-system 418 to execute one or more tasks associated with the synchronization. In an embodiment of the disclosure, the computing engine 414 is communicatively coupled with the registry 404 (such as the source repository 206 or target repository 208 of FIG. 2). The registry 404 is a storage location for the container images. The registry 404 interacts with the computing engine 414 to store and retrieve the container images as required. Details on the command have been explained with reference to at least FIG. 5. Further, details of the detection sub-system 418 have been explained with reference to at least FIG. 5, FIG. 6, FIG. 7, and FIG. 8A, and FIG. 9A.

Further, the driver 406 is a component that manages low-level operations of the image containers. The driver 406 includes a graph driver 420, a network driver 422, and an execution driver 424. The graph driver 420 includes a layer synchronization sub-system 426. In an embodiment of the disclosure, the layer synchronization sub-system 426 is a component of the system 202. The layer synchronization sub-system 426 is configured to manage the synchronization of the at least one source data layer with the target data layer. Further, the layer synchronization sub-system 426 ensures that the correct data layers are integrated into the image container 410. The network driver 422 manages network configurations for the image containers, ensuring that the image containers are able to communicate with each other and external networks. Further, the execution driver 424 manages the execution environment for the image containers, managing how the image containers run on the host system. In an embodiment of the disclosure, the graph driver 420 is communicatively coupled with the graph 408 and the image container 410. The graph 408 interacts with the graph driver 420 to manage the storage and retrieval of the data layers, ensuring efficient data handling. Further, the image container 410 stores the updated container image to be deployed and run. Details on the layer synchronization sub-system 426 have been explained with reference to at least FIG. 6, FIG. 8B, and FIG. 9B.

Figure 5:
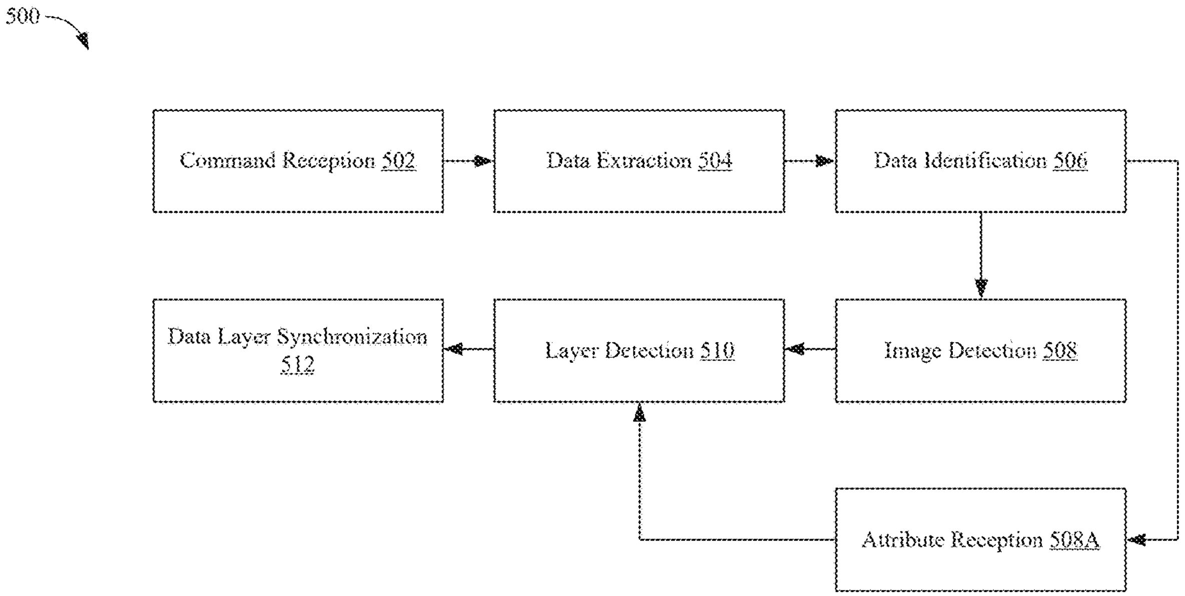
FIG. 5 is a diagram that illustrates exemplary operations of the system for the management of the data layer synchronization for the container images, in accordance with an embodiment of the disclosure.

FIG. 5 is a diagram that illustrates exemplary operations of the system 202 for the management of the data layer synchronization for the container images, in accordance with an embodiment of the disclosure. FIG. 5 is explained in conjunction with elements from FIG. 1, FIG. 2, FIG. 3, and FIG. 4. With reference to FIG. 5, there is shown a block diagram 500 that illustrates exemplary operations from 502 to 512, as described herein. The exemplary operations illustrated in the block diagram 500 start at 502 and are performed by any computing system, apparatus, or device, such as by the computer 102 of FIG. 1 or system 202 of FIG. 2. Although illustrated with discrete blocks, the exemplary operations associated with one or more blocks of the block diagram 500 are divided into additional blocks, combined into fewer blocks, or eliminated, depending on the particular implementation.

At 502, a command reception operation is executed. In the command reception operation, the system 202 is configured to receive the command for synchronizing the at least one source data layer of the source container image 216 with the target data layer of the target container image 218. In an embodiment of the disclosure, the command initiates the synchronization process, specifying which CVE needs to be addressed. For example, the command build <image-name>:<tag> shared <CVE-number> introduces a new functionality in docker for managing shared data layers (e.g., the at least one source data layer) between container images. In an embodiment of the disclosure, the <image-name> is the name of a container image, and <tag> is a specific version or variant of the container image. In an embodiment of the disclosure, the CVE number indicates that the target container image 218 includes a cybersecurity vulnerability identified by the CVE number. This command addresses the cybersecurity vulnerability in the target container image 218 by synchronizing the detected at least one source data layer with the target data layer of the target container image 218, ensuring that users have access to the latest versions of the target container image 218. For example, in the command push Image100:v10 shared layer CVE-2023-0464, it is determined that the system 202 is required to synchronize the source data layer associated with the CVE identifier 'CVE-2023-0464' into the target data layer of the target container image 218 e.g., Image100:v10.

At 504, a data extraction operation is executed. In the data extraction operation, the system 202 is configured to extract the at least one identifier from the command. In an embodiment of the disclosure, the at least one identifier corresponds to a reference for the at least one vulnerability in the target container image 218. For example, the at least one identifier includes at least one of the CVE of the at least one vulnerability or a bug identifier number of the at least one vulnerability. In an embodiment of the disclosure, the at least one identifier is used for locating correct source data layers in the source container images, such that the correct source data layers are synchronized with the target data layer. For example, the identifier is CVE-2023-0464, which indicates a specific vulnerability that the synchronization process aims to address.

At 506, a data identification operation is executed. In the data identification operation, the system 202 is configured to identify the at least one identifier in manifest information of each container image of the set of container images. For example, the manifest information includes a structure of each container image of the set of container images and a set of characteristics of each container image of the set of container images. The structure of each container image of the set of container images is composed of multiple components that work together to define how each container image of the set of container images is built and functions. For example, each container image of the set of container images is made up of multiple source data layers, each source data layer representing specific changes or additions. Further, the set of characteristics of each container image of the set of container images defines the properties and functionalities of each container image of the set of container images. For example, the properties and functionalities of each container image of the set of container images include a size of each container image of the set of container images indicating the total storage space of each container image of the set of container images, which can impact deployment speed and resource utilization of each container image of the set of container images. In an embodiment of the disclosure, the system 202 scans through the manifest information of each container image of the set of container images to identify which container image includes the at least one identifier. This step ensures that the synchronization process targets the correct source container image that includes the at least one source data layer.

At 508, an image detection operation is executed. In the image detection operation, the system 202 is configured to detect the source container image 216 from the set of container images based on the identification of the at least one identifier in the manifest information. The set of container images includes the source container image 216. In an embodiment of the disclosure, the manifest information associated with the detected source container image 216 includes the at least one identifier. In an embodiment of the disclosure, the source container image 216 is detected using the detection sub-system 418 based on the identification of the at least one identifier in the manifest information. The detection sub-system 418 of the system 202 performs operations 502, 504, 506, and 508 to detect the source container image 216.

Further, the system 202 is configured to determine source manifest information associated with the source container image 216 based on the detection of the at least one source data layer. Further, the system 202 is configured to generate the target manifest field associated with target manifest information of the target container image 218. In an embodiment of the disclosure, the target manifest field is generated using the detection sub-system 418 based on the source manifest information. In an embodiment of the disclosure, the target manifest field corresponds to a specific component or section within the target manifest information that is generated for the target container image 218. The target manifest field is generated to encapsulate information related to the at least one source data layer. For example, the target manifest field includes one or more references to the at least one source data layer.

For the generation of the target manifest field, the system 202 is configured to detect an availability of source layer content associated with the at least one source data layer in the source repository 206. In an embodiment of the disclosure, the availability of the source layer content in the source repository 206 is detected based on the source manifest information. In an embodiment of the disclosure, the source layer content corresponds to data or files associated with the at least one source data layer in the source container image 216. For example, the source layer content includes application binaries associated with the at least one source data layer, libraries associated with the at least one source data layer, configuration files associated with the at least one source data layer, or any additional resources associated with the at least one source data layer required for the operation of the source container image 216. For example, the source layer content includes a security patch to address the cybersecurity vulnerability of the target container image 218 by synchronizing the detected at least one source data layer with the target data layer of the target container image 218.

Further, the system 202 is configured to obtain one or more source attributes associated with the at least one source data layer based on the source manifest information and the detection of the availability of the source layer content. For example, the source manifest information includes a structure of the at least one source data layer and a set of characteristics of the at least one source data layer. The structure of the source container image 216 is composed of multiple components that work together to define how the source container image 216 is built and functions. For example, the source container image 216 is made up of multiple source data layers, each source data layer representing specific changes or additions, such as the operating system and application code. Further, the set of characteristics of the source container image 216 defines the properties and functionalities of the source container image 216. For example, the properties and functionalities of the source container image 216 include a size of the source container image 216 indicating the total storage space of the source container image 216, which can impact deployment speed and resource utilization of the source container image 216. In an embodiment of the present disclosure, the one or more source attributes correspond to first metadata associated with the at least one source data layer of the source container image 216. For example, the one or more source attributes include at least one of a digest of the at least one source data layer, a differential number of the at least one source data layer, an availability status of the at least one source data layer, a version of the at least one source data layer, the at least one identifier, or the like.

The system 202 is configured to generate the target manifest field for the target data layer based on the one or more source attributes. In an embodiment of the disclosure, a set of target data layers of the target container image 218 includes the target data layer. The system 202 is configured to store the target manifest field in the target repository 208. In an embodiment of the disclosure, the target manifest information includes a configuration of each target data layer of the set of target data layers and one or more characteristics associated with each target data layer of the set of target data layers. The configuration of each target data layer of the set of target data layers corresponds to specific settings and parameters that dictate how the configuration of each target data layer of the set of target data layers operates within the target container image 218. For example, the configuration of each target data layer of the set of target data layers includes environment variables, commands to execute the target container image 218, port mappings for network access, and volume mounts for data persistence. Further, the one or more characteristics associated with each target data layer of the set of target data layers correspond to attributes or properties that describe the set of target data layers in the target container image 218. For example, the one or more characteristics include at least one of a size of the set of the set of target data layers, a version of the set of target data layers, a digest of the set of target data layers, or a base image of the set of target data layers At 510, a layer detection operation is executed. In the layer detection operation, the system 202 is configured to detect the at least one source data layer of the source container image 216 based on the detection of the source container image 216.

At 512, a data layer synchronization operation is executed. In the data layer synchronization operation, the system 202 is configured to synchronize the detected at least one source data layer with the target data layer of the target container image 218. For the synchronization of the at least one source data layer with the target data layer, the system 202 is configured to obtain the target manifest field from the target repository 208. Further, the system 202 is configured to extract the one or more source attributes from the obtained target manifest field. The system 202 is configured to obtain the at least one source data layer from the source repository 206 based on the extracted one or more source attributes. Furthermore, the system 202 is configured to extract the source layer content from the obtained at least one source data layer. The system 202 is configured to integrate the extracted source layer content into the target data layer.

In various embodiments of the disclosure, at 508A, an attribute reception operation is performed upon performing the data identification operation at 506. In the attribute reception operation, the system 202 is configured to obtain the shared layer attribute from the source container image 216. In an embodiment of the disclosure, the shared layer attribute corresponds to second metadata used to detect the at least one source data layer within the source repository.

At 510, the layer detection operation is performed. In the layer detection operation, the system 202 is configured to detect the at least one source data layer of an original source container image 216A in the source repository. In an embodiment of the disclosure, the at least one source data layer is detected based on the shared layer attribute. In an embodiment of the disclosure, the original source container image 216A is a container image that includes the at least one source data layer. Further, the at least one source data layer includes updates or modifications that are required to be propagated to target container image 218.

Further, at 512, the data layer synchronization operation is executed. In the data layer synchronization operation, the system 202 is configured to synchronize the detected at least one source data layer with the target data layer of the target container image 218.

Figure 6:
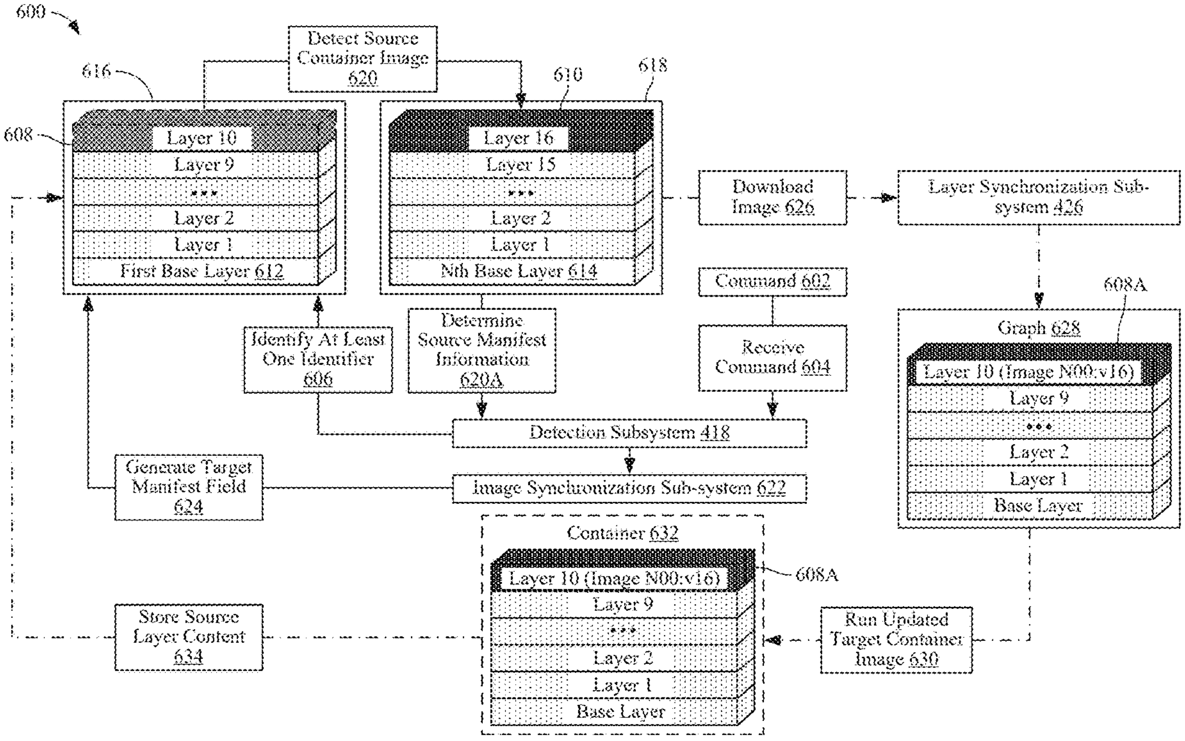
FIG. 6 is a diagram that illustrates exemplary operations of a detection sub-system of the system and a layer synchronization sub-system of the system for the management of the data layer synchronization for the container images, in accordance with an embodiment of the disclosure.

FIG. 6 is a diagram that illustrates exemplary operations of the detection sub-system 418 of the system 202 and the layer synchronization sub-system 426 of the system 202 for the management of the data layer synchronization for the container images, in accordance with an embodiment of the disclosure. FIG. 6 is explained in conjunction with elements from FIG. 1, FIG. 2, FIG. 3, FIG. 4, and FIG. 5.

As shown in diagram 600 of FIG. 6, the system 202 receives the command 602 including the at least one identifier via the user device 204, at 604. For example, the command is build <image-name>:<tag> shared <CVE-number>. The CVE number in the command 602 indicates that the target container image includes a cybersecurity vulnerability identified by the CVE number.

Further, the detection sub-system 418 receives the command 602. At 606, the detection sub-system 418 identifies the at least one identifier in the manifest information of each container image of the set of container images. As depicted, the set of images includes a first container image 608, up to nth container image 610. In an embodiment of the disclosure, the first container image includes layer 1 to layer 10, and a first base layer 612. The nth container image also includes a layer 1 to layer 16, and an nth base layer 614. The first container image is stored in a first repository 616 (e.g., the target repository). Further, the nth container image is stored in an nth repository 618 (e.g., the source repository). Further, the detection sub-system 418 is configured to detect the source container image from the set of container images based on the identification of the at least one identifier in the manifest information, at 620. The detection sub-system 418 is also configured to detect the at least one source data layer of the source container image based on the detection of the source container image. As depicted, layer 16 of the nth container image 610 corresponds to the at least one source data layer including the security patch to be synchronized with the target layer e.g., layer 10 of the first container image 608 (e.g., the target container image). Further, the detection sub-system 418 is configured to determine the source manifest information associated with the source container image based on the detection of the at least one source data layer, at 620A. Further, an image synchronization sub-system 622 of the system 202 is configured to generate the target manifest field based on the source manifest information, at 624. The target manifest field is associated with the target manifest information of the first container image 608. Based on the generated target manifest field, the nth container image 610 (e.g., source container image) is downloaded at 626. The operation performed at 626 ensures that the at least one source data layer is available for integration.

Furthermore, the layer synchronization sub-system 426 is configured to synchronize the at least one source data layer with the target data layer of the first container image 608 based on the target manifest field. The synchronization process involves incorporating the at least one source data layer, such as the layer 16 from the source container image (e.g., the nth container image 610), into the target data layer (e.g., layer 10) of the target container image (e.g., the first container image 608). Further, a graph 628 associated with the first container image 608 is updated to reflect an updated first container image 608A, showing the inclusion of the at least one source data layer (e.g., layer 10 (Nth Image N00:v16)). Once the synchronization process is complete, the system 202 runs the updated first container image 608A, at 630. In an embodiment of the disclosure, a container 632 associated with the updated first container image 608A includes all the data layers including the at least one sourced data layer, ensuring it operates with the latest configurations and data layers. This process efficiently updates and synchronizes container images by using the at least one source data layer (e.g., layer 16), optimizing resource usage and deployment speed of the system 202. Further, at 634, the source layer content of the at least one source layer is stored in the first repository.

Figure 7:
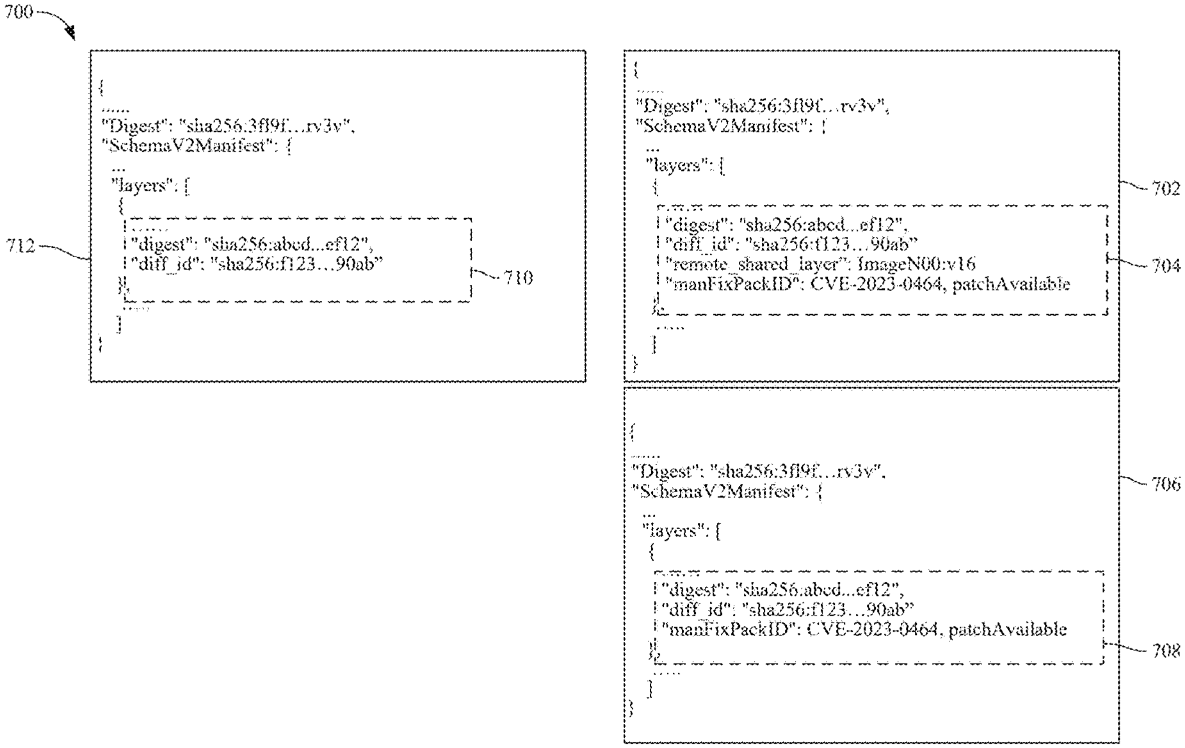
FIG. 7 is a diagram that illustrates a pictorial depiction for the generation of a target manifest field, in accordance with an embodiment of the disclosure.

FIG. 7 is a diagram that illustrates a pictorial depiction of the generation of the target manifest field, in accordance with an embodiment of the disclosure. FIG. 7 is explained in conjunction with elements from FIG. 1, FIG. 2, FIG. 3, FIG. 4, FIG. 5, and FIG. 6. In an embodiment of the disclosure, the detection sub-system 418 generates the target manifest field.

The process of generation of the target manifest field is triggered by issuing the command e.g., build <image-name>:<tag> shared <CVE-number>. Upon receiving the command, the detection sub-system 418 parses the command to identify the target container image and the CVE number. The detection sub-system 418 further identifies the CVE number in the manifest information of each container image of the set of container images. The detection sub-system 418 detects the source container image 702 from the set of container images based on the identification of the at least one identifier in the manifest information 704 of the source container image 702. Further, the detection sub-system 418 determines that the at least one source data layer is absent in the source container image 702. As depicted, the detection sub-system 418 obtains the shared layer attribute (e.g., "remote_shared_layer": ImageN00:v16") from the manifest information 704 of the source container image 702. In an embodiment of the disclosure, the shared layer attribute corresponds to the second metadata used to detect the at least one source data layer within the source repository.

Further, the detection sub-system 418 detects the at least one source data layer of the original source container image 706 in the source repository. In an embodiment of the disclosure, the at least one source data layer is detected based on the shared layer attribute. The detection sub-system 418 examines the manifest information 708 of the original source container image 706 to ensure that the at least one source data layer exists in the original source container image 706. Further, the detection sub-system 418 generates the target manifest field 710 for the target container image 712, which includes details, such as the layer digest, size, and configuration information of the target container image 712. The target manifest field 710 is added to the target manifest information of the target container image 712. In an embodiment of the disclosure, the one or more source attributes are added to the target manifest field 710 indicating the at least one source data layer. After integrating the one or more source attributes attribute into the target manifest information, the layer synchronization sub-system 426 synchronizes the detected at least one source data layer with the target data layer of the target container image 712.

Figure 8A:
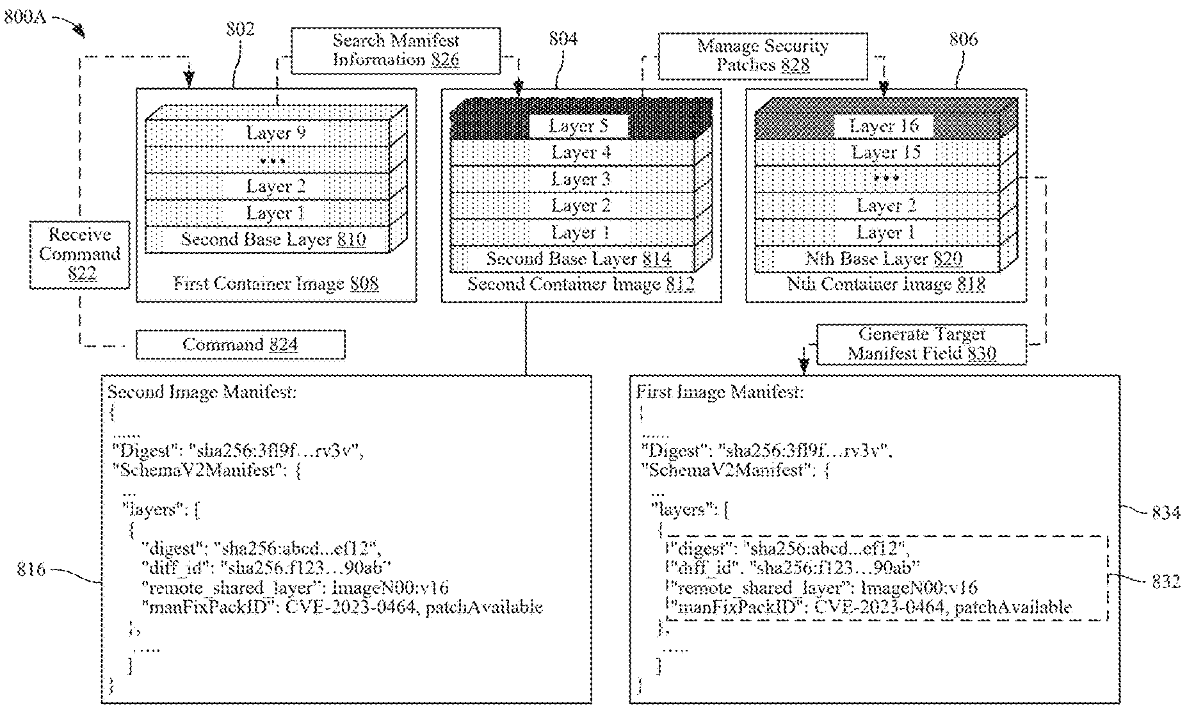
FIG. 8A is a diagram that illustrates exemplary operations of the detection sub-system for the management of the data layer synchronization for the container images, in accordance with an embodiment of the disclosure.
Figure 8B:
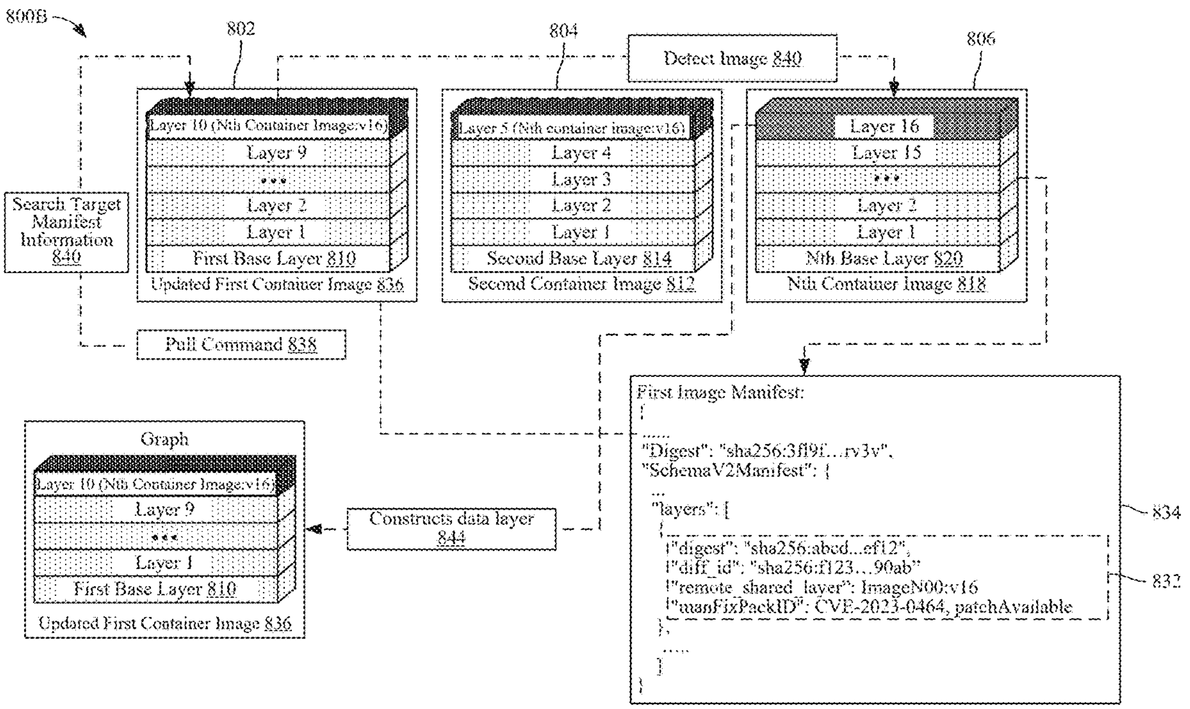
FIG. 8B is a diagram that illustrates exemplary operations of the layer synchronization sub-system for the management of the data layer synchronization for the container images, in accordance with an embodiment of the disclosure.

FIG. 8A is a diagram that illustrates exemplary operations of the detection sub-system 418 for the management of the data layer synchronization for the container images, in accordance with an embodiment of the disclosure. FIG. 8B is a diagram that illustrates exemplary operations of the layer synchronization sub-system 426 for the management of the data layer synchronization for the container images, in accordance with an embodiment of the disclosure. FIG. 8A and FIG. 8B are explained in conjunction with elements from FIG. 1, FIG. 2, FIG. 3, FIG. 4, FIG. 5, FIG. 6, and FIG. 7. For the sake of brevity, FIG. 8A and FIG. 8B are explained together.

With reference to the diagram of FIG. 8A, the pictorial depiction represents a first multi-repository architecture 800A (also called first architecture) designed to facilitate operations of the detection sub-system 418 of the system 202 for the synchronization of the data layers in the container images. The architecture includes a first repository 802, a second repository 804, up to Nth repository 806. In an embodiment of the disclosure, each of the first repository 802, the second repository 804, up to the Nth repository 806 includes a container image. The first repository 802 includes a first container image 808 including a first base layer 810 that serves as a foundation for the first repository 802, and layer 1 to layer 9. The layer 1 to layer 9 of the first repository 802 represent additional application-specific layers that are built upon the first base layer 810, providing required functionalities and dependencies. The first container image 808 also includes a layer 10 (shown in FIG. 8B). The layer 10 is the target data layer, which is currently vacant and prepared to receive updates for security patches. The first container image 808 corresponds to the target container image including the vulnerability to be addressed.

Further, the second repository 804 includes a second container image 812 including a second base layer 814 and layer 1 to layer 5. The second container image 812 is the source container image including the at least one identifier in the manifest information 816. Furthermore, the Nth repository 806 includes an Nth container image 818 including an Nth base layer 820 and the layer 1 to the layer 15. The Nth container image 818 also includes an additional layer e.g., a layer 16. In an embodiment of the disclosure, the layer 16 incorporates a critical security patch designed to address the high-severity CVE.

At 822, the command 824 is received from the user. For example, the command 824 is "build first container image: v10 shared layer CVE-2023-0464". The command 824 initiates the process of building a new image e.g., the first container image 808 with the tag v10. The command 824 specifies that the target data layer (e.g., layer 10) related to the CVE identifier CVE-2023-0464 is required to be included in the first container image 808.

At 826, the system 202 searches the manifest information of each container image of the set of container images for entries that have a manFixPackID labeled as CVE-2023-0464 and a patchStatus of patchAvailable. In an embodiment of the disclosure, the search successfully identifies the second container image 812 on the second repository 804 including the CVE identifier. As depicted, the manifest information 816 includes the CVE identifier e.g., CVE-2023-0464. The system 202 obtains the shared layer attribute from the manifest information 816 of the second container image 812. The system 202 further detects the at least one source data layer (e.g., layer 16) associated with the original source container image (e.g., the nth container image 818) in the source repository (e.g., the nth repository 806). For example, the system 202 obtains the shared layer attribute indicating that the at least one source data layer is located in the Nth container image:v16. The operation performed by the system 202 at 826 ensures that the system 202 has located the correct source layer that addresses the specified vulnerability.

At 828, the detection sub-system 418 is invoked to facilitate the management of security patches located inside the at least one source data layer (e.g., layer 16) across multiple container images. The detection sub-system 418 examines the nth repository 806 to detect the nth image:v16, confirming that the at least one source layer data exists and is accessible. The operation performed by the system 202 at 828 is crucial for ensuring that the required data layer is available for synchronization before proceeding with the build process.

At 830, the target manifest field 832 is generated in the target manifest information 834 of the target container image (e.g., the first container image 808). This involves copying metadata from the manifest information of Nth image:v16, including the digest, diff_id, and manFixPackID into the target manifest information 834. Further, the layer 10 is set to Nth image:v16 linking the first container image 808 to the at least one source data layer (e.g., layer 16). Further, an updated first container image 836 including the target manifest field (e.g., Layer 10 (Nth container image:v16)) is depicted in FIG. 8B. The operation performed by the system 202 at 830 ensures that the first container image: V10 is properly configured to include the required updates related to the CVE, allowing it to inherit the security improvements from the at least one source layer.

With reference to the diagram of FIG. 8B, the pictorial depiction represents a second multi-repository architecture 800B (also called second architecture) designed to facilitate operations of the layer synchronization sub-system 426 of the system 202 for the synchronization of the data layers in the container images. After the updated first container image 836 is generated, the system 202 generates a pull command 838. Further, at 840, the system 202 searches the target manifest information of the updated first container image based on the pull command 838 to locate the tag v10 or the manFixPackID labeled as CVE-2023-0464 with a patch status of 'patchAvailable'. This search confirms that the updated first container image is correctly tagged, and the relevant patch information is available in the nth container image 818. The system 202 retrieves the at least one sourced data layer: nth container image:v16 from the target manifest information of the updated first container image:v10, ensuring that the synchronization process is properly documented in the target manifest field of the updated first container image.

Further, the system 202 detects the nth container image: v16 to check whether the at least one source data layer (layer 16) exists in the nth container image 818. This involves querying the source repository where the nth container image:v16 is stored to verify that the at least one source data layer is available for use. The operation performed by the system 202 at 842 is critical to ensure that the synchronization can proceed without issues, as the absence of the at least one source data layer may prevent the synchronization process from completing successfully.

At 844, the system 202 constructs a new data layer for the first container image:v10 on a local machine. This involves pulling the source layer content from the at least one source data layer into the local environment. The source layer content is integrated into the first container image's filesystem, allowing the first container image:v10 to include the updates and patches associated with the CVE. The operation performed by the system 202 at 844 finalizes the synchronization process, ensuring that the new image is equipped with the latest security enhancements.

Figure 9A:
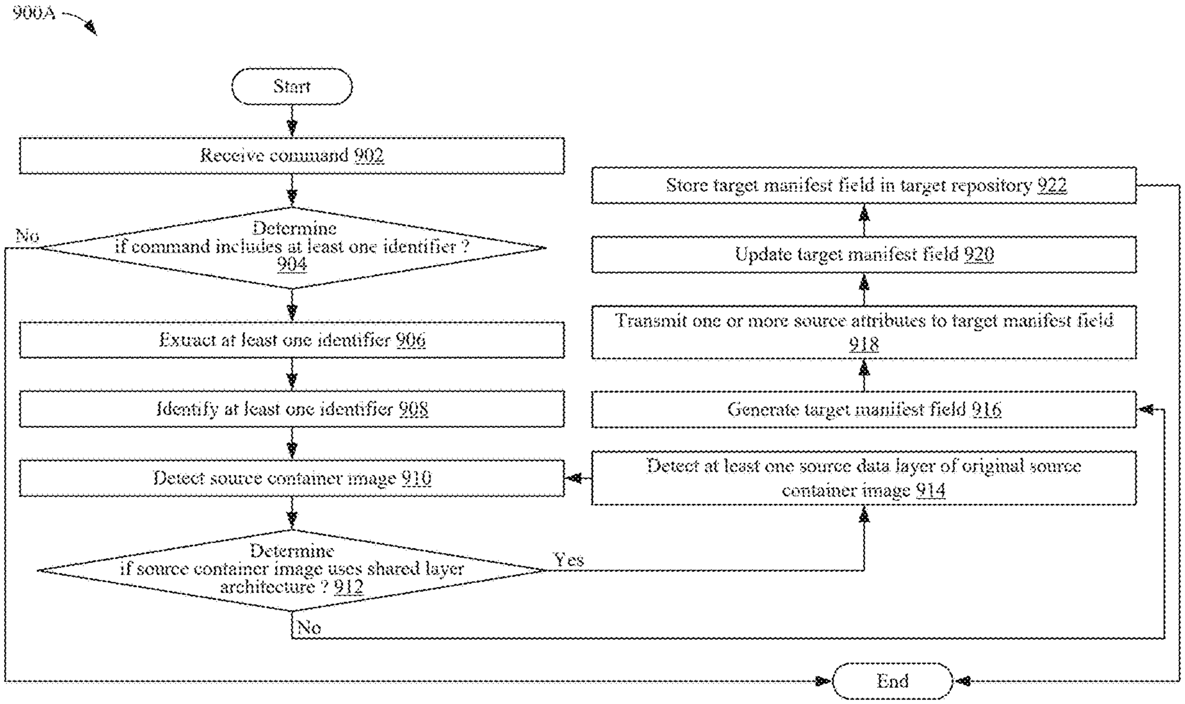
FIG. 9A is a diagram that illustrates a flowchart of a first method for the detection sub-system, in accordance with an embodiment of the disclosure.
Figure 9B:
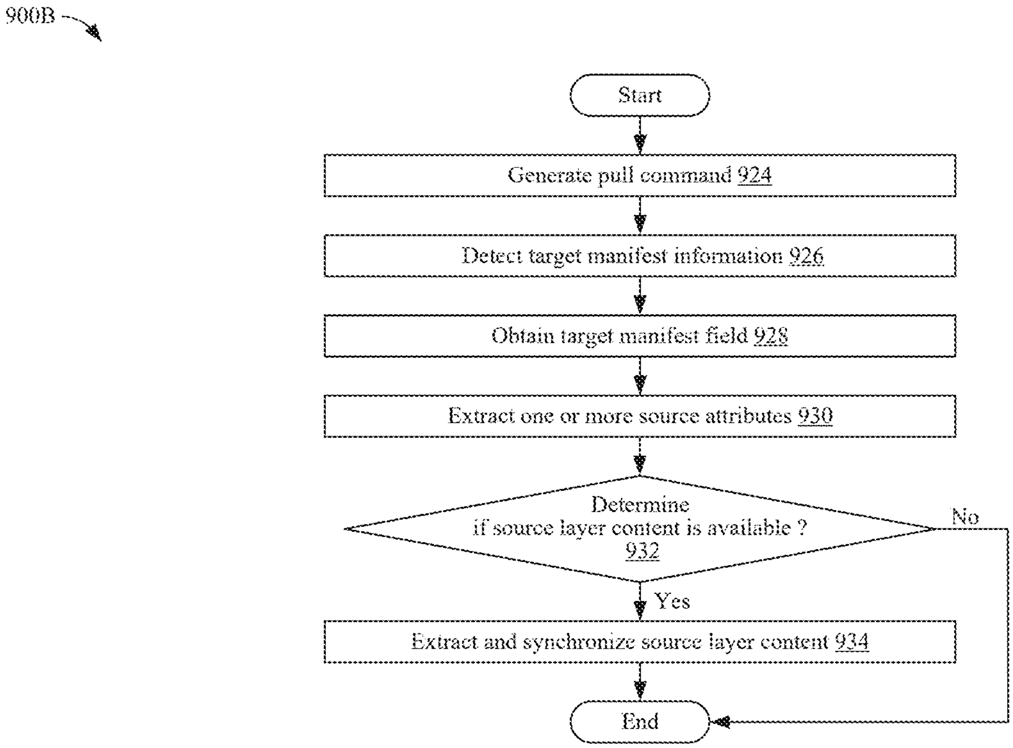
FIG. 9B is a diagram that illustrates a flowchart of a second method for the layer synchronization sub-system, in accordance with an embodiment of the disclosure.

FIG. 9A is a diagram that illustrates a flowchart of a first method for the detection sub-system 418, in accordance with an embodiment of the disclosure. FIG. 9B is a diagram that illustrates a flowchart of a second method for the layer synchronization sub-system 426, in accordance with an embodiment of the disclosure. For the sake of brevity, FIG. 9A and FIG. 9B are explained together. FIG. 9A and FIG. 9B are explained in conjunction with elements from FIG. 1, FIG. 2, FIG. 3, FIG. 4, FIG. 5, FIG. 6, FIG. 7, FIG. 8A, and FIG. 8B.

At 902, the command is received. In an embodiment of the disclosure, the detection sub-system 418 of the system 202 receives and parses the command, such as build Image100:v10 shared layer CVE-2023-0464. For parsing the command, the detection sub-system 418 of the system 202 analyzes and interprets the command. For example, the command indicates an operation type (e.g., build), the target container image (e.g., image100:v10), and the at least one identifier (e.g., CVE-2023-0464). The details of the command have been explained with reference to at least FIG. 5.

At 904, it is determined if the command includes the at least one identifier. In an embodiment of the disclosure, the detection sub-system 418 of the system 202 determines if the command includes the at least one identifier. If the command includes the at least one identifier, the process moves to 906. If the command does not include the at least one identifier, the process ends. The details on the at least one identifier have been explained with reference to at least FIG. 5 and FIG. 6.

At 906, the at least one identifier (e.g., CVE-2023-0464) from the command is extracted. In an embodiment of the disclosure, the detection sub-system 418 of the system 202 extracts the at least one identifier from the command. The details on the extraction of the at least one identifier have been explained with reference to at least FIG. 5.

At 908, the at least one identifier is identified in the manifest information of each container image of the set of container images. In an embodiment of the disclosure, the detection sub-system 418 of the system 202 identifies the at least one identifier in the manifest information of each container image of the set of container images. The detection sub-system 418 of the system 202 searches for data layers where the manFixPackID matches the at least one identifier (e.g., CVE-2023-0464) and verifies that the patch status (e.g., the status of the at least one source data layer) is marked as available. When a match is found, the system 202 identifies the source container image including the at least one source data layer, such as ImageM00:v5. The details on the identification of the at least one identifier have been explained with reference to at least FIG. 5, FIG. 7, and FIG. 8A.

At 910, the source container image is detected from the set of container images based on the identification of the at least one identifier in the manifest information. In an embodiment of the disclosure, the detection sub-system 418 of the system 202 detects the source container image from the set of container images based on the identification of the at least one identifier in the manifest information. For example, the source container image is ImageM00, and the tag of the source container image is v5. The details on the detection of the source container image have been explained with reference to at least FIG. 5, FIG. 7, and FIG. 8A.

At 912, it is determined if the source container image uses a shared layer architecture. In an embodiment of the disclosure, the detection sub-system 418 of the system 202 determines if the source container image uses a shared layer architecture by detecting the shared layer attribute in the source manifest information of the source container image. If the shared layer attribute is detected in the source manifest information, the process moves to 914. If the shared layer attribute is not detected in the source manifest information, the process moves to 916.

At 914, the at least one source data layer of the original source container image is detected in the source repository. In an embodiment of the disclosure, the detection sub-system 418 of the system 202 detects the at least one source data layer of the original source container image in the source repository. The at least one source data layer is detected based on the shared layer attribute. For example, the system 202 obtains reference information for the at least one source data layer, such as the image name (ImageN00) and tag (v16). The details on the detection of the at least one source data layer of the original source container image have been explained with reference to at least FIG. 2 and FIG. 7, FIG. 8A, and FIG. 8B.

Further, the source container image is detected from the set of container images based on the detection of the at least one source data layer of the original source container image, at 910.

At 916, the target manifest field associated with the target manifest information of the target container image is generated. In an embodiment of the disclosure, the detection sub-system 418 of the system 202 generates the target manifest field associated with the target manifest information of the target container image when it is determined that the source container image fails to use the shared layer architecture. The details on the generation of the target manifest field have been explained with reference to at least FIG. 5.

At 918, the one or more source attributes associated with the at least one source data layer are transmitted to the target manifest field. In an embodiment of the disclosure, the detection sub-system 418 of the system 202 transmits the one or more source attributes associated with the at least one source data layer to the target manifest field. For example, the one or more source attributes may be a digest of the at least one source data layer and the differential number of the at least one source data layer. The details on the one or more source attributes have been explained with reference to at least FIG. 5 and FIG. 7.

At 920, the target manifest field is updated. In an embodiment of the disclosure, the detection sub-system 418 of the system 202 updates the target manifest field. For updating the target manifest field, the detection sub-system 418 of the system 202 sets the manFixPackID with the CVE number and updates the patch status field (for example, available) to maintain vulnerability tracking information.

At 922, the target manifest field is stored in the target repository. In an embodiment of the disclosure, the detection sub-system 418 of the system 202 stores the target manifest field in the target repository. The details on the target manifest field have been explained with reference to at least FIG. 5.

At 924, a pull command for obtaining the target manifest field is generated. In an embodiment of the disclosure, the layer synchronization sub-system 426 of the system 202 generates the pull command for obtaining the target manifest field from the target repository. In an embodiment of the disclosure, the pull command is generated by the system 202.

At 926, the target manifest information is detected in the target repository. In an embodiment of the disclosure, the layer synchronization sub-system 426 detects the target manifest information in the target repository.

At 928, the target manifest field is obtained from the target manifest information. The target manifest information is stored in the target repository. In an embodiment of the disclosure, the layer synchronization sub-system 426 of the system 202 obtains the target manifest field from the target repository. The details on obtaining the target manifest field have been explained with reference to at least FIG. 5.

At 930, the one or more source attributes are extracted from the target manifest field. In an embodiment of the disclosure, the layer synchronization sub-system 426 of the system 202 extracts the one or more source attributes from the target manifest field. The details on extracting the one or more source attributes have been explained with reference to at least FIG. 5.

At 932, it is determined if the source layer content is available in the at least one source data layer based on the one or more source attributes. In an embodiment of the disclosure, the layer synchronization sub-system 426 of the system 202 determines if the source layer content is available in the at least one source data layer based on the one or more source attributes. If the source layer content is available in the at least one source data layer, the process moves to 934. If the source layer content is not available in the at least one source data layer, the process ends.

At 934, the source layer content is extracted from the at least one source data layer. In an embodiment of the disclosure, the layer synchronization sub-system 426 of the system 202 extracts the source layer content from the at least one source data layer. Further, the layer synchronization sub-system 426 of the system 202 integrates the extracted source layer content into the target data layer. The details on extracting the source layer content from the at least one source data layer have been explained with reference to at least FIG. 5, and FIG. 8B.

Figure 10:
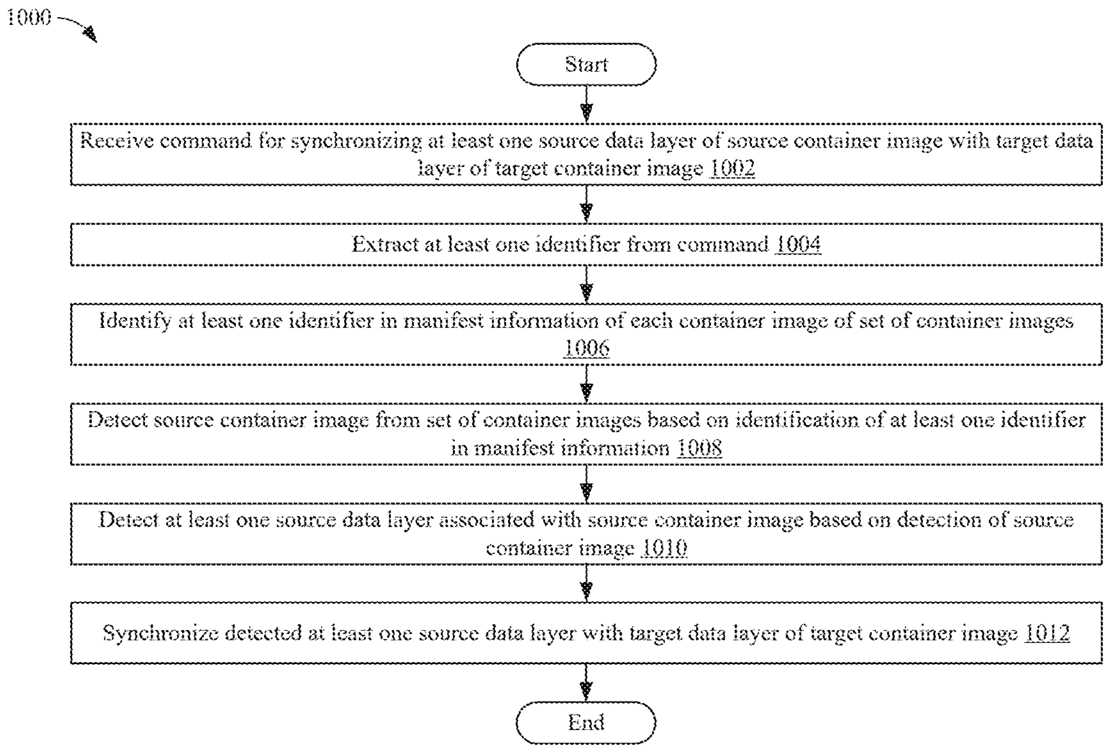
FIG. 10 is a diagram that illustrates a first flowchart of a method for the management of the data layer synchronization for the container images, in accordance with an embodiment of the disclosure.

FIG. 10 is a diagram that illustrates a first flowchart of a method for the management of data layer synchronization for container images, in accordance with an embodiment of the disclosure. FIG. 10 is explained in conjunction with elements from FIG. 1, FIG. 2, FIG. 3, FIG. 4, FIG. 5, FIG. 6, FIG. 7, FIG. 8A, FIG. 8B, FIG. 9A and FIG. 9B. The operations of the exemplary computer-implemented method are executed by any computing system, for example, by the computer 102 of FIG. 1 or the system 202 of FIG. 2. The operations of the first flowchart 1000 may start at 1002.

At 1002, a command for synchronizing at least one source data layer of a source container image with a target data layer of a target container image is received. In an embodiment of the disclosure, the system 202 is configured to receive a command to synchronize the at least one source data layer of the source container image with the target data layer of the target container image. In an embodiment of the disclosure, the source container image is a starting point from which the at least one source data layer may be extracted and synchronized with the target data layer of the target container image. The target container image is a destination container image that may receive the at least one source data layer from the source container image. Further, the at least one source data layer corresponds to one or more individual data layers within the source container image that contain specific data or functionality to be synchronized with the target data layer. Details about the reception of the command are provided, for example, in FIG. 5.

At 1004, at least one identifier is extracted from the command. In an embodiment of the disclosure, the system 202 is configured to extract the at least one identifier from the command. In an embodiment of the disclosure, the at least one identifier corresponds to a reference for at least one vulnerability in the target container image. For example, the at least one identifier includes at least one of Common Vulnerabilities and Exposures (CVE) of the at least one vulnerability or a bug identifier number of the at least one vulnerability. Details about the extraction of the at least one identifier are provided, for example, in FIG. 5.

At 1006, the at least one identifier is identified in manifest information of each container image of a set of container images. In an embodiment of the disclosure, the system 202 is configured to identify the at least one identifier in the manifest information of each container image of the set of container images. Details about identification of the at least one identifier are provided, for example, in FIG. 5, FIG. 6, FIG. 8A, and FIG. 9A.

At 1008, the source container image is detected from the set of container images based on the identification of the at least one identifier in the manifest information. In an embodiment of the disclosure, the system 202 is configured to detect the source container image from the set of container images based on the identification of the at least one identifier in the manifest information. The set of container images includes the source container image. In an embodiment of the disclosure, the manifest information associated with the detected source container image includes the at least one identifier. Details about the detection of the source container image are provided, for example, in FIG. 5, FIG. 6, FIG. 7, and FIG. 9A.

At 1010, the at least one source data layer of the source container image is detected based on the detection of the source container image. In an embodiment of the disclosure, the system 202 is configured to detect the at least one source data layer of the source container image based on the detection of the source container image. Details about the determination of the source manifest information are provided, for example, in FIG. 5, and FIG. 6.

At 1012, the at least one source data layer is synchronized with the target data layer of the target container image based on the target manifest field. In an embodiment of the disclosure, the system 202 is configured to synchronize the detected at least one source data layer with the target data layer of the target container image based on the target manifest field. Details about the synchronization of the at least one source data layer with the target data layer are provided, for example, in FIG. 5 and FIG. 6.

While the above operation of the system 202 shown in FIG. 10 are described in a particular sequence, the operation of the system 202 may occur in variations to the sequence in accordance with various embodiments of the disclosure. Further, details related to operation of FIG. 10, which are already covered in the description related to FIG. 1 to FIG. 9B is not discussed again in detail here for the sake of brevity.

Figure 11:
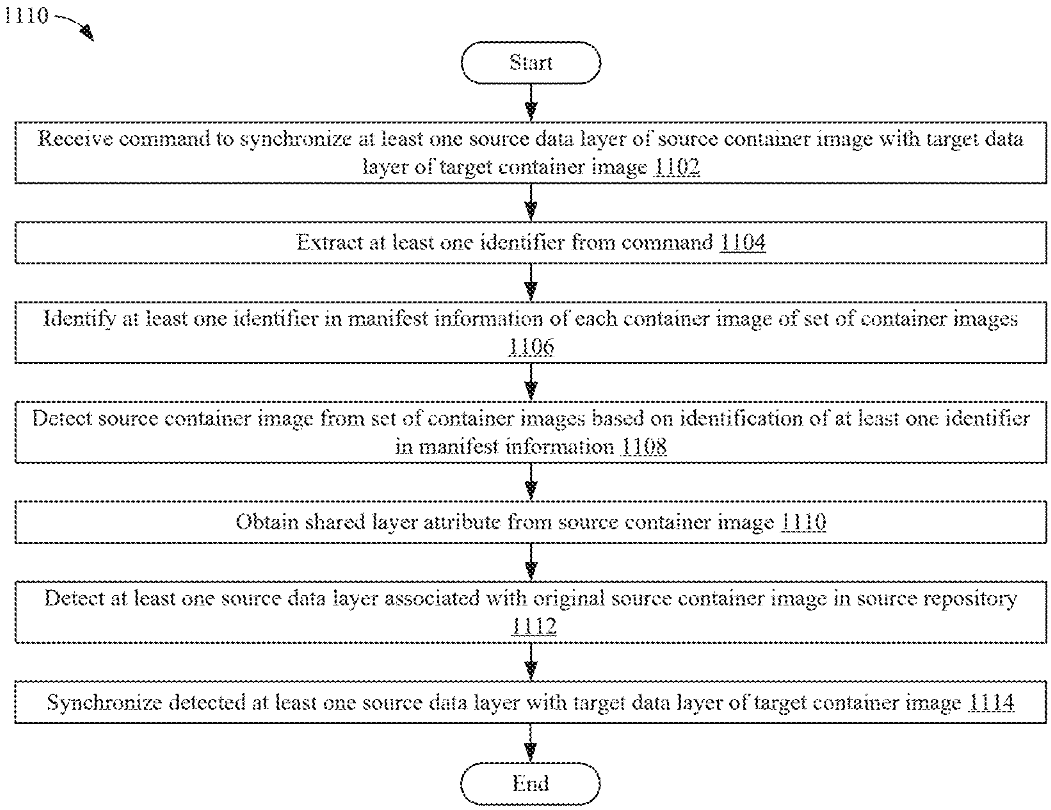
FIG. 11 is a diagram that illustrates a second flowchart of a method for the management of the data layer synchronization for the container images, in accordance with an embodiment of the disclosure.

FIG. 11 is a diagram that illustrates a second flowchart of a method for the management of the data layer synchronization for the container images, in accordance with an embodiment of the disclosure. FIG. 11 is explained in conjunction with elements from FIG. 1, FIG. 2, FIG. 3, FIG. 4, FIG. 5, FIG. 6, FIG. 7, FIG. 8, FIG. 9A, FIG. 9B, and FIG. 10. The operations of the exemplary computer-implemented method are executed by any computing system, for example, by the computer 102 of FIG. 1 or the system 202 of FIG. 2. The operations of the second flowchart 1100 may start at 1102.

At 1102, a command for synchronizing at least one source data layer of a source container image with a target data layer of a target container image is received. In an embodiment of the disclosure, the system 202 is configured to receive a command to synchronize the at least one source data layer of the source container image with the target data layer of the target container image. Details about the reception of the command are provided, for example, in FIG. 5 and FIG. 10.

At 1104, at least one identifier is extracted from the command. In an embodiment of the disclosure, the system 202 is configured to extract the at least one identifier from the command. In an embodiment of the disclosure, the at least one identifier corresponds to a reference for at least one vulnerability in the target container image. For example, the at least one identifier includes at least one of Common Vulnerabilities and Exposures (CVE) of the at least one vulnerability or a bug identifier number of the at least one vulnerability. Details about the extraction of the at least one identifier are provided, for example, in FIG. 5.

At 1106, the at least one identifier is identified in manifest information of each container image of a set of container images. In an embodiment of the disclosure, the system 202 is configured to identify the at least one identifier in the manifest information of each container image of the set of container images. Details about identification of the at least one identifier are provided, for example, in FIG. 5, FIG. 6, FIG. 8A, and FIG. 9A.

At 1108, the source container image is detected from the set of container images based on the identification of the at least one identifier in the manifest information. In an embodiment of the disclosure, the system 202 is configured to detect the source container image from the set of container images based on the identification of the at least one identifier in the manifest information. The set of container images includes the source container image. In an embodiment of the disclosure, the manifest information associated with the detected source container image includes the at least one identifier. Details about the detection of the source container image are provided, for example, in FIG. 5, FIG. 6, FIG. 7, and FIG. 9A.

At 1110, a shared layer attribute is obtained from the source container image. In an embodiment of the disclosure, the system 202 is configured to obtain the shared layer attribute from the source container image. In an embodiment of the present disclosure, the shared layer attribute corresponds to second metadata used to detect the at least one source data layer within a source repository. Details about obtaining the shared layer attribute are provided, for example, in FIG. 5, FIG. 8A, and FIG. 9A.

At 1112, the at least one source data layer of an original source container image is detected based on the detection of the source container image. In an embodiment of the disclosure, the system 202 is configured to detect the at least one source data layer of the original source container image based on the detection of the source container image. In an embodiment of the disclosure, the at least one source data layer is detected based on the shared layer attribute. Details about the detection of the at least one source data layer are provided, for example, in FIG. 5, FIG. 8A, and FIG. 9A.

At 1114, the at least one source data layer is synchronized with the target data layer of the target container image based on the target manifest field. In an embodiment of the disclosure, the system 202 is configured to synchronize the detected at least one source data layer with the target data layer of the target container image based on the target manifest field. Details about the synchronization of the at least one source data layer with the target data layer are provided, for example, in FIG. 5, FIG. 8B and FIG. 9B.

While the above operation of the system 202 shown in FIG. 11 are described in a particular sequence, the operation may occur in variations to the sequence in accordance with various embodiments of the disclosure. Further, details related to operation of FIG. 11, which are already covered in the description related to FIG. 1 to FIG. 10 are not discussed again in detail here for the sake of brevity.

The system 202 presents multiple advantages, such as enhancement in hardware efficiency by allowing multiple container images to share the same data layers, particularly those that contain patches for vulnerabilities. The system 202 improves processing efficiency by introducing a method that streamlines the synchronization of container layers. Rather than duplicating or reprocessing unrequired data, the system 202 selectively identifies, extracts, and synchronizes only the required layers of a source container image with a target container image. This targeted synchronization reduces redundant operations. The process begins with the automated extraction of the at least one identifier from the command. The at least one identifier is used to detect the at least one source data layer in the source container image, ensuring that only relevant data is processed. By automating the detection of the at least one source data layer, the system 202 eliminates the need for manual identification, reducing human error and accelerating the operation. Furthermore, re-usage of the at least one source data layer from repositories further minimizes processing time for data synchronization operations, as data layers that are already available do not need to be rebuilt or re-synchronized. This ensures that computational resources are allocated only to tasks that are required for synchronization, which is particularly beneficial for large-scale container environments. By reducing unnecessary processing, the system 202 optimizes hardware utilization, allowing for more efficient use of CPU and memory resources, ultimately enhancing overall performance and scalability of the system 202 in resource-constrained environments.

Further, the system 202 optimizes memory usage by focusing on synchronizing specific data layers rather than entire container images. This selective synchronization approach significantly reduces the memory required for storing and processing data during the operation. For example, by detecting the availability of the required source layer content in a repository before proceeding with the synchronization, the system 202 avoids allocating memory for unavailable or irrelevant layers. The storage of target manifest fields is efficient, as these fields are compact and include references to the required source data layers rather than duplicating the underlying data. This reduces the memory footprint associated with managing and maintaining container image metadata. Moreover, the re-usage of the at least one source data layer eliminates the need for storing duplicate data layers, further conserving memory resources. The system 202 also supports scalable memory management. By generating and storing only the required metadata, such as digests, availability statuses, and version information, the system 202 efficiently utilizes memory resources even in complex container environments with large numbers of images and layers. This makes the system 202 particularly suitable for environments with limited memory capacity.

Further, the system 202 is compatible with existing container tools, such as Docker. This ensures that the system 202 can be seamlessly integrated into current workflows without requiring users to adopt new tools or significantly alter their workflows. This compatibility reduces the learning curve for users and simplifies the adoption process. The ability of the system 202 to detect and apply matched patches based on CVE numbers or bug identifiers from image repositories enhances its utility for maintaining secure and up-to-date container environments. Users can identify vulnerabilities in source containers and quickly synchronize secure layers with target containers, ensuring that the environment remains protected from known threats. Further, the advantage of the system 202 is the ability of the system 202 to reuse the source layer content to update the target data layer in the repository. This eliminates unrequired duplication and ensures that updates are applied efficiently. By reusing existing data wherever possible, the system 202 reduces the computational and storage overhead associated with updates. The automated processes for detecting, extracting, and synchronizing data layers also make the system 202 highly user-friendly. Developers and users can easily maintain and upgrade the entire container environment without extensive manual intervention or the need to consider the negative impacts of erroneous patches. This reduces the risk of downtime or instability of the system 202 caused by faulty updates. By synchronizing only, the required data layers and leveraging references in manifest fields, the system 202 minimizes clutter in repositories, ensuring that they remain easy to manage over time.

In various embodiments of the disclosure, a computer program product for managing data layer synchronization for container images is described. The computer program product includes one or more computer-readable storage medium and program instructions stored on the one or more computer-readable storage media to perform operations. The operations include receiving a command for synchronizing at least one source data layer of a source container image with a target data layer of a target container image. The operations include extracting at least one identifier from the command. Further, the operations include identifying the at least one identifier in the manifest information of each container image of a set of container images. The operations include detecting the source container image from the set of container images based on the identification of the at least one identifier in the manifest information. The set of container images includes the source container image. The manifest information associated with the detected source container image includes the at least one identifier. The operations include detecting the at least one source data layer of the source container image based on the detection of the source container image. The operations include synchronizing the detected at least one source data layer with the target data layer of the target container image.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a computer, a command for synchronizing at least one source data layer of a source container image with a target data layer of a target container image;

extracting, by the computer, at least one identifier from the command;

identifying, by the computer, the at least one identifier in manifest information of each container image of a set of container images;

detecting, by the computer, the source container image from the set of container images based on the identification of the at least one identifier in the manifest information, wherein the set of container images comprises the source container image, and wherein the manifest information associated with the detected source container image comprises the at least one identifier;

detecting, by the computer, the at least one source data layer associated with the source container image based on the detection of the source container image; and synchronizing, by the computer, the detected at least one source data layer with the target data layer of the target container image.

2. The computer-implemented method of claim 1, further comprising:

determining, by the computer, source manifest information associated with the source container image based on the detection of the at least one source data layer; and generating, by the computer, a target manifest field based on the source manifest information, wherein the target manifest field is associated with target manifest information of the target container image, and wherein the target manifest field comprises one or more references to the at least one source data layer.

3. The computer-implemented method of claim 2, further comprising:

detecting, by the computer, an availability of source layer content associated with the at least one source data layer in a source repository, wherein the availability of the source layer content in the source repository is detected based on the source manifest information;

obtaining, by the computer, one or more source attributes associated with the at least one source data layer based on the source manifest information and the detection of the availability of the source layer content, wherein the one or more source attributes correspond to first metadata associated with the at least one source data layer of the source container image;

generating, by the computer, the target manifest field for the target data layer based on the one or more source attributes, wherein a set of target data layers of the target container image comprises the target data layer; and storing, by the computer, the target manifest field in a target repository.

4. The computer-implemented method of claim 3, further comprising:

obtaining, by the computer, the target manifest field from the target repository;

extracting, by the computer, the one or more source attributes from the obtained target manifest field;

obtaining, by the computer, the at least one source data layer from the source repository based on the extracted one or more source attributes;

extracting, by the computer, the source layer content from the obtained at least one source data layer; and integrating, by the computer, the extracted source layer content into the target data layer.

5. The computer-implemented method of claim 3, wherein the source manifest information comprises a structure of the at least one source data layer and a set of characteristics of the at least one source data layer.

6. The computer-implemented method of claim 3, wherein the target manifest information comprises a configuration of each target data layer of the set of target data layers and one or more characteristics associated with each target data layer of the set of target data layers, wherein the one or more characteristics comprise at least one of a size of the set of target data layers, a version of the set of target data layers, a digest of the set of target data layers, or a base image of the set of target data layers.

7. The computer-implemented method of claim 4, wherein the one or more source attributes comprise at least one of a digest of the at least one source data layer, a differential number of the at least one source data layer, an availability status of the at least one source data layer, a version of the at least one source data layer, or the at least one identifier.

8. The computer-implemented method of claim 1, wherein the at least one identifier corresponds to a reference for at least one vulnerability in the target container image, and wherein the at least one identifier comprises at least one of Common Vulnerabilities and Exposures (CVE) of the at least one vulnerability and a bug identifier number of the at least one vulnerability.

9. A computer system, comprising:

a processor set;

one or more computer-readable storage media; and program instructions stored on the one or more computer-readable storage media, the program instructions executable by the processor set to cause the processor set to:

receive a command to synchronize at least one source data layer of a source container image with a target data layer of a target container image;

extract at least one identifier from the command;

identify the at least one identifier in manifest information of each container image of a set of container images;

detect the source container image from the set of container images based on the identification of the at least one identifier in the manifest information, wherein the set of container images comprises the source container image, and wherein the manifest information associated with the detected source container image comprises the at least one identifier;

obtain a shared layer attribute from the source container image, wherein the shared layer attribute corresponds to second metadata used to detect the at least one source data layer within a source repository;

detect the at least one source data layer associated with an original source container image in the source repository, wherein the at least one source data layer is detected based on the shared layer attribute; and synchronize the detected at least one source data layer with the target data layer of the target container image.

10. The computer system of claim 9, wherein the program instructions further cause the processor set to:

determine source manifest information associated with the original source container image based on the detection of the at least one source data layer; and generate a target manifest field based on the source manifest information, wherein the target manifest field is associated with target manifest information of the target container image, and wherein the target manifest field comprises one or more references to the at least one source data layer.

11. The computer system of claim 10, wherein the program instructions further cause the processor set to:

detect an availability of source layer content associated with the at least one source data layer in the source repository, wherein the availability of the source layer content in the source repository is detected based on the source manifest information;

obtain one or more source attributes associated with the at least one source data layer based on the source manifest information and the detection of the availability of the source layer content, wherein the one or more source attributes correspond to first metadata associated with the at least one source data layer of the original source container image;

generate the target manifest field for the target data layer based on the one or more source attributes, wherein a set of target data layers of the target container image comprises the target data layer; and store the target manifest field in a target repository.

12. The computer system of claim 11, wherein the program instructions further cause the processor set to:

obtain the target manifest field from the target repository;

extract the one or more source attributes from the obtained target manifest field;

obtain the at least one source data layer from the source repository based on the extracted one or more source attributes;

extract the source layer content from the obtained at least one source data layer; and integrate the extracted source layer content into the target data layer.

13. The computer system of claim 11, wherein the source manifest information comprises a structure of the at least one source data layer and a set of characteristics of the at least one source data layer.

14. The computer system of claim 11, wherein the target manifest information comprises a configuration of each target data layer of the set of target data layers and one or more characteristics associated with each target data layer of the set of target data layers, wherein the one or more characteristics comprise at least one of a size of the set of target data layers, a version of the set of target data layers, a digest of the set of target data layers, or a base image of the set of target data layers.

15. The computer system of claim 12, wherein the one or more source attributes comprise at least one of a digest of the at least one source data layer, a differential number of the at least one source data layer, an availability status of the at least one source data layer, a version of the at least one source data layer, or the at least one identifier.

16. The computer system of claim 9, wherein the at least one identifier corresponds to a reference for at least one vulnerability in the target container image, and wherein the at least one identifier comprises at least one of Common Vulnerabilities and Exposures (CVE) of the at least one vulnerability and a bug identifier number of the at least one vulnerability.

17. A computer program product for synchronizing at least one source data layer of a source container image with a target data layer of a target container image, the computer program product comprising:

one or more computer-readable storage media; and program instructions stored on the one or more computer-readable storage media to perform operations comprising:

receiving a command for synchronizing the at least one source data layer of the source container image with the target data layer of the target container image;

extracting at least one identifier from the command;

identifying the at least one identifier in manifest information of each container image of a set of container images;

detecting the source container image from the set of container images based on the identification of the at least one identifier in the manifest information, wherein the set of container images comprises the source container image, and wherein the manifest information associated with the detected source container image comprises the at least one identifier;

detecting the at least one source data layer associated with the source container image based on the detection of the source container image; and synchronizing the detected at least one source data layer with the target data layer of the target container image.

18. The computer program product of claim 17, wherein the program instructions stored on the one or more computer-readable storage media perform the operations further comprising:

determining source manifest information associated with the source container image based on the detection of the at least one source data layer; and generating a target manifest field based on the source manifest information, wherein the target manifest field is associated with target manifest information of the target container image, and wherein the target manifest field comprises one or more references to the at least one source data layer.

19. The computer program product of claim 18, wherein the program instructions stored on the one or more computer-readable storage media perform the operations further comprising:

detecting an availability of source layer content associated with the at least one source data layer in a source repository, wherein the availability of the source layer content in the source repository is detected based on the source manifest information;

obtaining one or more source attributes associated with the at least one source data layer based on the source manifest information and the detection of the availability of the source layer content, wherein the one or more source attributes correspond to first metadata associated with the at least one source data layer of the source container image;

generating the target manifest field for the target data layer based on the one or more source attributes, wherein a set of target data layers of the target container image comprises the target data layer; and storing the target manifest field in a target repository.

20. The computer program product of claim 19, wherein the program instructions stored on the one or more computer-readable storage media perform the operations further comprising:

obtaining the target manifest field from the target repository;

extracting the one or more source attributes from the obtained target manifest field;

obtaining the at least one source data layer from the source repository based on the extracted one or more source attributes;

extracting the source layer content from the obtained at least one source data layer; and integrating the extracted source layer content into the target data layer.

* * * * *